(12) United States Patent
Kumari et al.

(10) Patent No.: US 12,414,087 B2
(45) Date of Patent: Sep. 9, 2025

(54) DISTRIBUTED SENSING WITH LOW-RESOLUTION ANALOG-TO-DIGITAL CONVERTERS

(71) Applicant: QUALCOMM Incorporated, San Diego, CA (US)

(72) Inventors: Preeti Kumari, San Diego, CA (US); Kapil Gulati, Belle Mead, NJ (US); Anantharaman Balasubramanian, San Diego, CA (US); Junyi Li, Fairless Hills, PA (US); Stelios Stefanatos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 17/930,784

(22) Filed: Sep. 9, 2022

(65) Prior Publication Data

US 2024/0089927 A1  Mar. 14, 2024

(51) Int. Cl.
*H04W 72/04* (2023.01)
*H04W 92/18* (2009.01)

(52) U.S. Cl.
CPC ............ *H04W 72/04* (2013.01); *H04W 92/18* (2013.01)

(58) Field of Classification Search
CPC . H04W 56/0015; H04W 72/04; H04W 92/18; H04W 72/005; H04W 72/30; H04W 72/044; H04W 72/02; H04W 72/0446; H04W 72/0453; H04W 72/1221; H04W 72/1257; H04W 72/20; H04W 72/23; H04W 72/25; H04W 72/535; H04W 72/542; H04W 74/002; H04W 74/0808; H04W 84/047; H04W 88/04; H04B 7/024; H04L 1/1812; H04L 1/1819; H04L 1/1854; H04L 1/1887; H04L 1/1896; H04L 5/0055; H04L 5/0094; H04L 5/0007; H04L 5/0082
See application file for complete search history.

(56) References Cited

U.S. PATENT DOCUMENTS

2020/0100215 A1* 3/2020 Li ..................... H04W 72/535
2022/0191782 A1* 6/2022 Ratasuk ............ H04W 52/0206
2023/0354228 A1* 11/2023 Kim .................. H04W 56/0015

FOREIGN PATENT DOCUMENTS

CN        109644433 A      4/2019
WO    WO-2010088598 A2   8/2010
(Continued)

OTHER PUBLICATIONS

WO 2022/019352 A1 (Year: 2022).*
International Search Report and Written Opinion—PCT/US2023/071358—ISA/EPO—Nov. 28, 2023.

*Primary Examiner* — Rushil P. Sampat
(74) *Attorney, Agent, or Firm* — Harrity & Harrity, LLP

(57) ABSTRACT

Various aspects of the present disclosure generally relate to wireless communication. In some aspects, a network node may receive, from one or more user equipments (UEs), feedback information associated with a distributed sensing procedure. The network node may select, based at least in part on the feedback information, a set of UEs to be included in the distributed sensing procedure. The network node may transmit, to the set of UEs, an indication of configuration parameters associated with the distributed sensing procedure. Numerous other aspects are described.

30 Claims, 11 Drawing Sheets

(56) References Cited

FOREIGN PATENT DOCUMENTS

| WO | WO-2022103504 A1 | 5/2022 |
| WO | WO-2022132395 A1 | 6/2022 |
| WO | WO-2022133951 A1 | 6/2022 |

* cited by examiner

DISTRIBUTED SENSING WITH LOW-RESOLUTION ANALOG-TO-DIGITAL CONVERTERS

FIELD OF THE DISCLOSURE

Aspects of the present disclosure generally relate to wireless communication and to techniques and apparatuses for distributed sensing with low-resolution analog-to-digital converters.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a network node. The method may include receiving, from one or more user equipments (UEs), feedback information associated with a distributed sensing procedure. The method may include selecting, based at least in part on the feedback information, a set of UEs to be included in the distributed sensing procedure. The method may include transmitting, to the set of UEs, an indication of configuration parameters associated with the distributed sensing procedure.

Some aspects described herein relate to a method of wireless communication performed by an apparatus of a UE. The method may include transmitting, to a network node, feedback information associated with a distributed sensing procedure. The method may include receiving, from the network node, configuration parameters associated with the distributed sensing procedure, wherein the configuration parameters include at least one low-resolution analog-to-digital converter (ADC) setting. The method may include performing the distributed sensing procedure based at least in part on the configuration parameters.

Some aspects described herein relate to a network node for wireless communication. The network node may include a memory and one or more processors coupled to the memory. The one or more processors may be configured to receive, from one or more UEs, feedback information associated with a distributed sensing procedure. The one or more processors may be configured to select, based at least in part on the feedback information, a set of UEs to be included in the distributed sensing procedure. The one or more processors may be configured to transmit, to the set of UEs, an indication of configuration parameters associated with the distributed sensing procedure.

Some aspects described herein relate to a UE for wireless communication. The UE may include a memory and one or more processors coupled to the memory. The one or more processors may be configured to transmit, to a network node, feedback information associated with a distributed sensing procedure. The one or more processors may be configured to receive, from the network node, configuration parameters associated with the distributed sensing procedure, wherein the configuration parameters include at least one low-resolution ADC setting. The one or more processors may be configured to perform the distributed sensing procedure based at least in part on the configuration parameters.

Some aspects described herein relate to a non-transitory computer-readable medium that stores a set of instructions for wireless communication by a network node. The set of instructions, when executed by one or more processors of the network node, may cause the network node to receive, from one or more UEs, feedback information associated with a distributed sensing procedure. The set of instructions, when executed by one or more processors of the network node, may cause the network node to select, based at least in part on the feedback information, a set of UEs to be included in the distributed sensing procedure. The set of instructions, when executed by one or more processors of the network node, may cause the network node to transmit, to the set of UEs, an indication of configuration parameters associated with the distributed sensing procedure.

Some aspects described herein relate to a non-transitory computer-readable medium that stores a set of instructions for wireless communication by a UE. The set of instructions, when executed by one or more processors of the UE, may cause the UE to transmit, to a network node, feedback information associated with a distributed sensing procedure. The set of instructions, when executed by one or more processors of the UE, may cause the UE to receive, from the network node, configuration parameters associated with the distributed sensing procedure, wherein the configuration parameters include at least one low-resolution ADC setting. The set of instructions, when executed by one or more processors of the UE, may cause the UE to perform the distributed sensing procedure based at least in part on the configuration parameters.

Some aspects described herein relate to an apparatus for wireless communication. The apparatus may include means for receiving, from one or more UEs, feedback information associated with a distributed sensing procedure. The apparatus may include means for selecting, based at least in part on the feedback information, a set of UEs to be included in the distributed sensing procedure. The apparatus may include means for transmitting, to the set of UEs, an indication of configuration parameters associated with the distributed sensing procedure.

Some aspects described herein relate to an apparatus for wireless communication. The apparatus may include means for transmitting, to a network node, feedback information associated with a distributed sensing procedure. The apparatus may include means for receiving, from the network node, configuration parameters associated with the distributed sensing procedure, wherein the configuration parameters include at least one low-resolution ADC setting. The apparatus may include means for performing the distributed sensing procedure based at least in part on the configuration parameters.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
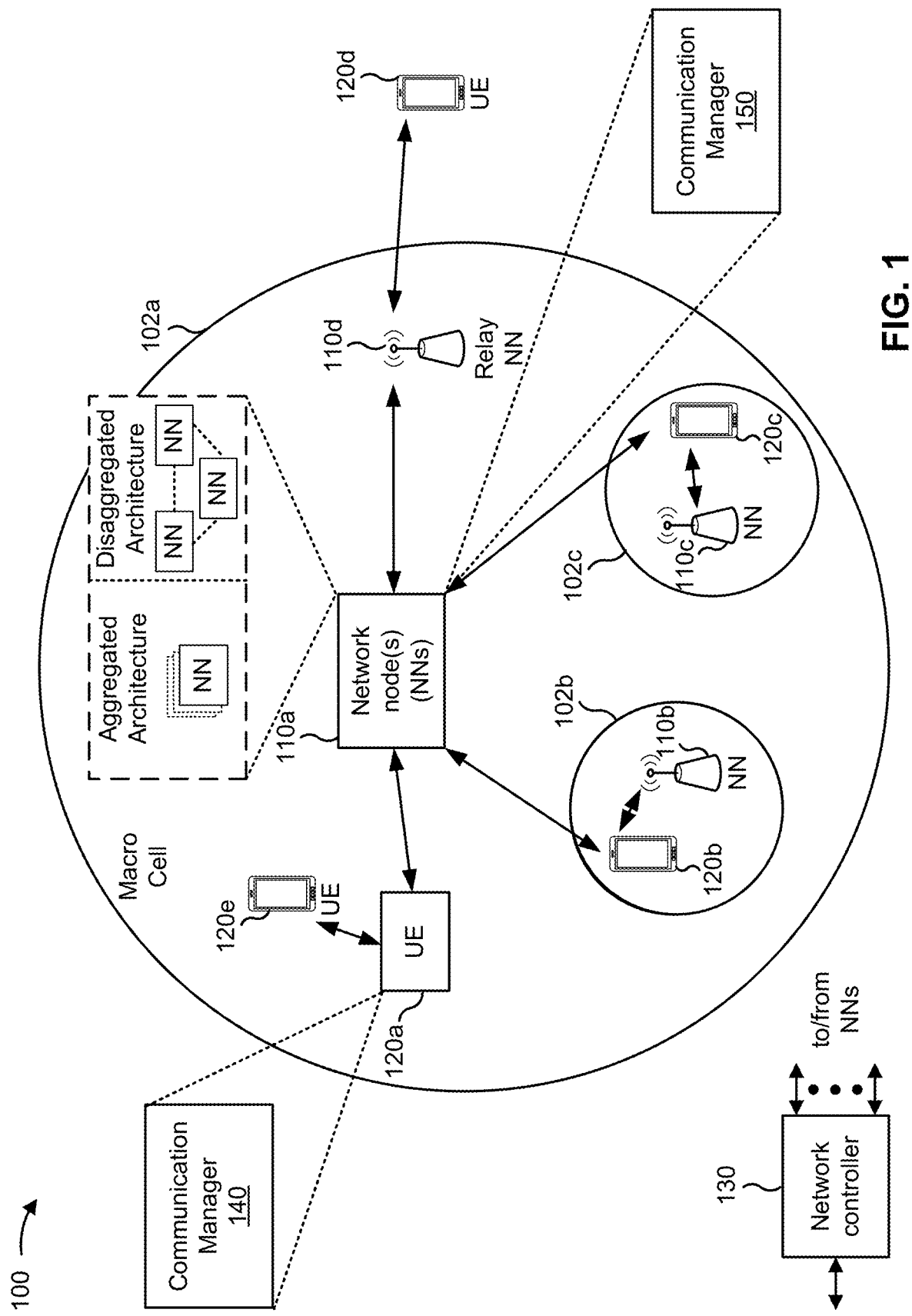
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device.

In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node 110 may include a communication manager 150. As described in more detail elsewhere herein, the communication manager 150 may receive, from one or more UEs 120, feedback information associated with a distributed sensing procedure; select, based at least in part on the feedback information, a set of UEs 120 to be included in the distributed sensing procedure; and transmit, to the set of UEs 120, an indication of configuration parameters associated with the distributed sensing procedure. Additionally, or alternatively, the communication manager 150 may perform one or more other operations described herein.

In some aspects, the UE 120 may include a communication manager 140. As described in more detail elsewhere herein, the communication manager 140 may transmit, to a network node 110, feedback information associated with a distributed sensing procedure; receive, from the network node 110, configuration parameters associated with the distributed sensing procedure, wherein the configuration parameters include at least one low-resolution analog-to-digital converter (ADC) setting; and perform the distributed sensing procedure based at least in part on the configuration parameters. Additionally, or alternatively, the communication manager 140 may perform one or more other operations described herein.

As indicated above, FIG. 1 is provided as an example. Other examples may differ from what is described with regard to FIG. 1.

Figure 2:
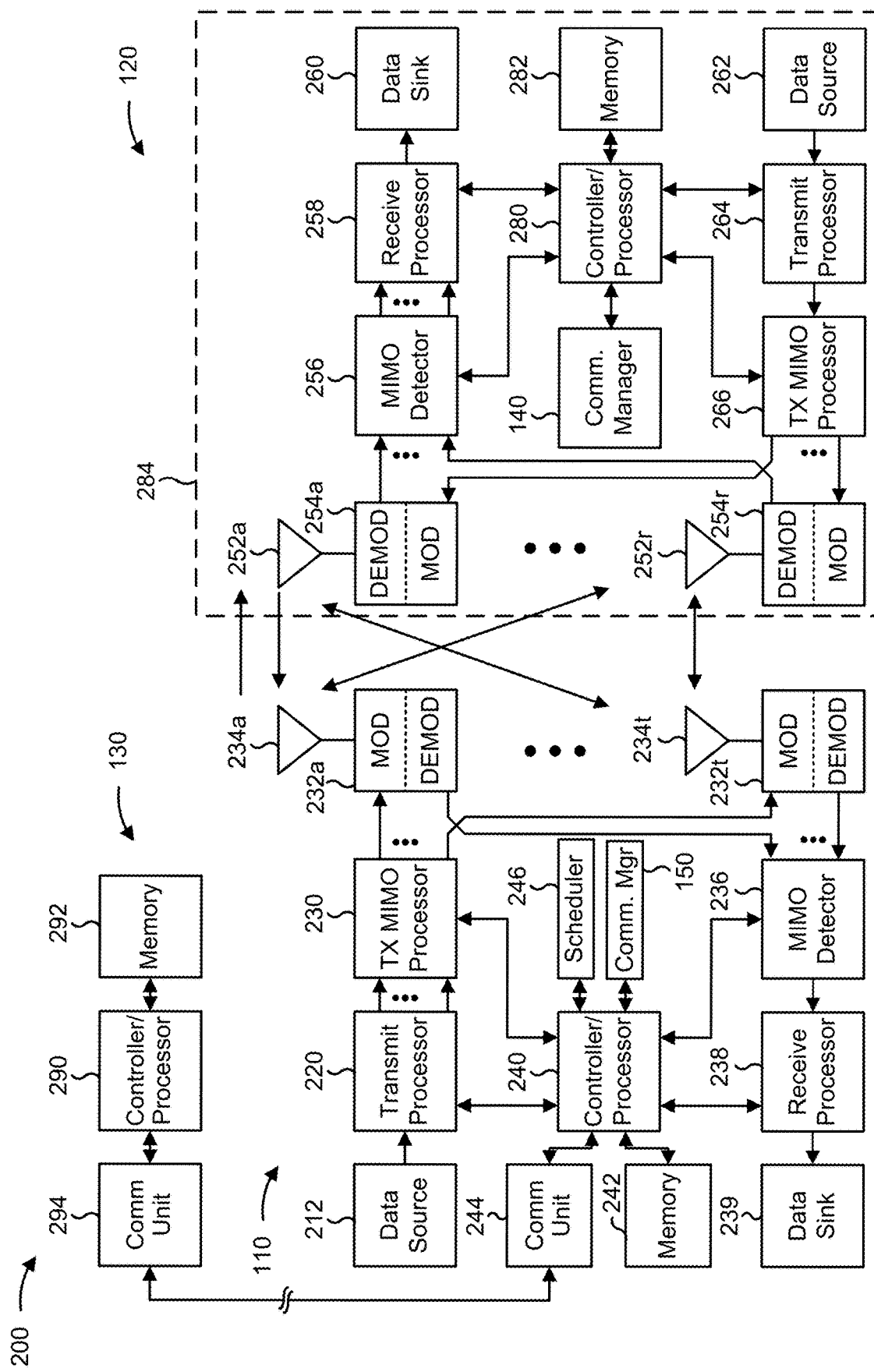
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with distributed sensing with low-resolution analog-to-digital converters, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the network node 110 includes means for receiving, from one or more UEs 120, feedback information associated with a distributed sensing procedure; means for selecting, based at least in part on the feedback information, a set of UEs 120 to be included in the distributed sensing procedure; and/or means for transmitting, to the set of UEs 120, an indication of configuration parameters associated with the distributed sensing procedure. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for transmitting, to a network node 110, feedback information associated with a distributed sensing procedure; means for receiving, from the network node 110, configuration parameters associated with the distributed sensing procedure, wherein the configuration parameters include at least one low-resolution ADC setting; and/or means for performing the distributed sensing procedure based at least in part on the configuration parameters. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
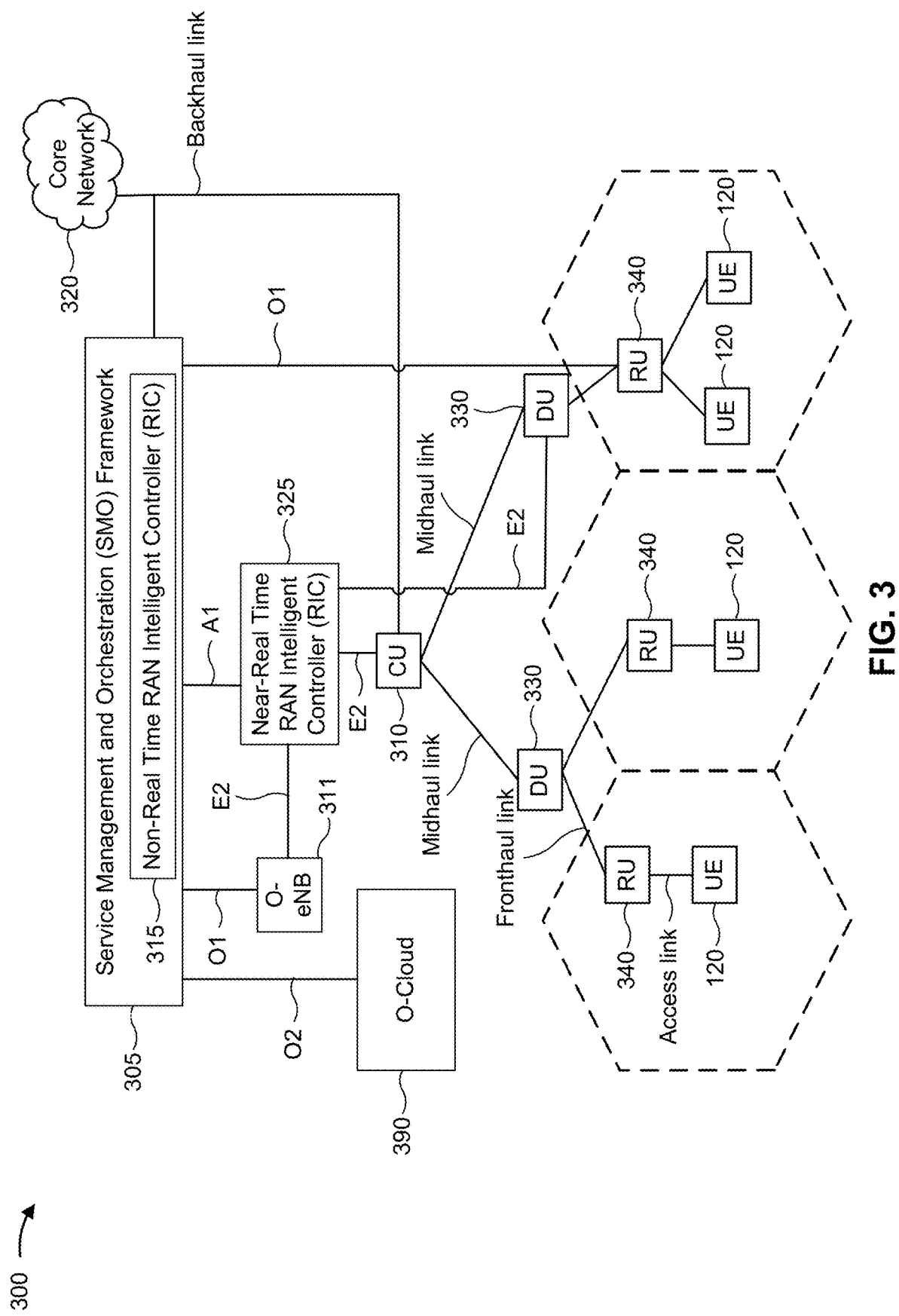
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
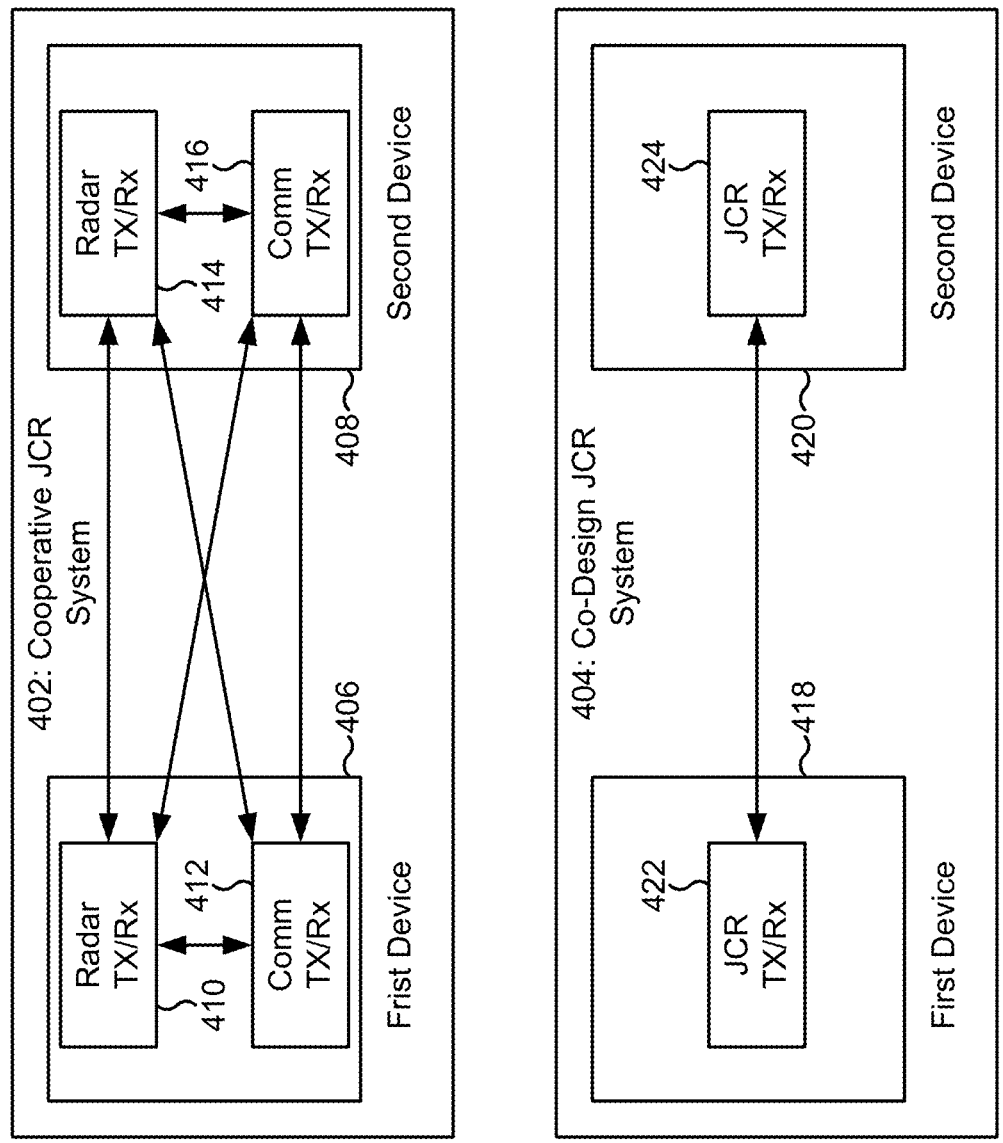
FIG. 4 is a diagram illustrating an example of joint communication-radar (JCR) systems, in accordance with the present disclosure.

FIG. 4 is a diagram illustrating an example 400 of joint communication-radar (JCR) systems, in accordance with the present disclosure.

In some examples, a network device (e.g., a UE 120, a network node 110, or a similar network device) may include JCR capability and/or include a JCR system. JCR systems may be systems that are capable of sharing frequency bands between radar and communication systems in a network device. In some instances, JCR systems may be categorized as cooperative JCR systems, as schematically shown by reference number 402, or co-design JCR systems, as schematically shown by reference number 404.

In cooperative JCR systems, network devices, such as a first device 406 and a second device 408, may include separate radar and communication systems. For example, the first device 406 may include a radar system 410 and a communication system 412, and the second device 408 may similarly include a radar system 414 and a communication system 416. In such cases, some information may be shared between the radar systems 410, 414 and the corresponding communication systems 412, 416 to improve the systems' performance without altering the core operation of the respective systems. In some cases, benefits realized by implementing a cooperative JCR system include spectrum reuse and ease of implementation as compared to other JCR systems.

In co-design JCR systems, network devices, such as a first device 418 and a second device 420, may include a common transmitter and/or receiver used for both communication and radar functionalities. For example, the first device 418 may include a JCR transmitter/receiver 422, and the second device 420 may similarly include a JCR transmitter/receiver 424. In such aspects, the JCR transmitter/receivers 422, 424 may include functionality to generate various transmit waveforms (e.g., waveforms applicable to radar functionality as well as waveforms applicable to communication functionality) and/or may include functionality to process received waveforms of radar and/or communication systems. In some cases, benefits realized by implementing a co-design JCR system include spectrum reuse and hardware reuse.

In some cases, communication capabilities of a JCR system may utilize one type of waveform, such as a CP-OFDM waveform, and radar capabilities of a JCR system may utilize another type of waveform, such as a time division multiplexing (TDM) waveform. However, in some other cases, both communication capabilities and radar capabilities of a JCR system may utilize the same waveform, such as a CP-OFDM waveform. Examples of using a CP-OFDM waveform for radar sensing are described in more detail below in connection with FIG. 5.

As indicated above, FIG. 4 is provided as an example. Other examples may differ from what is described with respect to FIG. 4.

Figure 5:
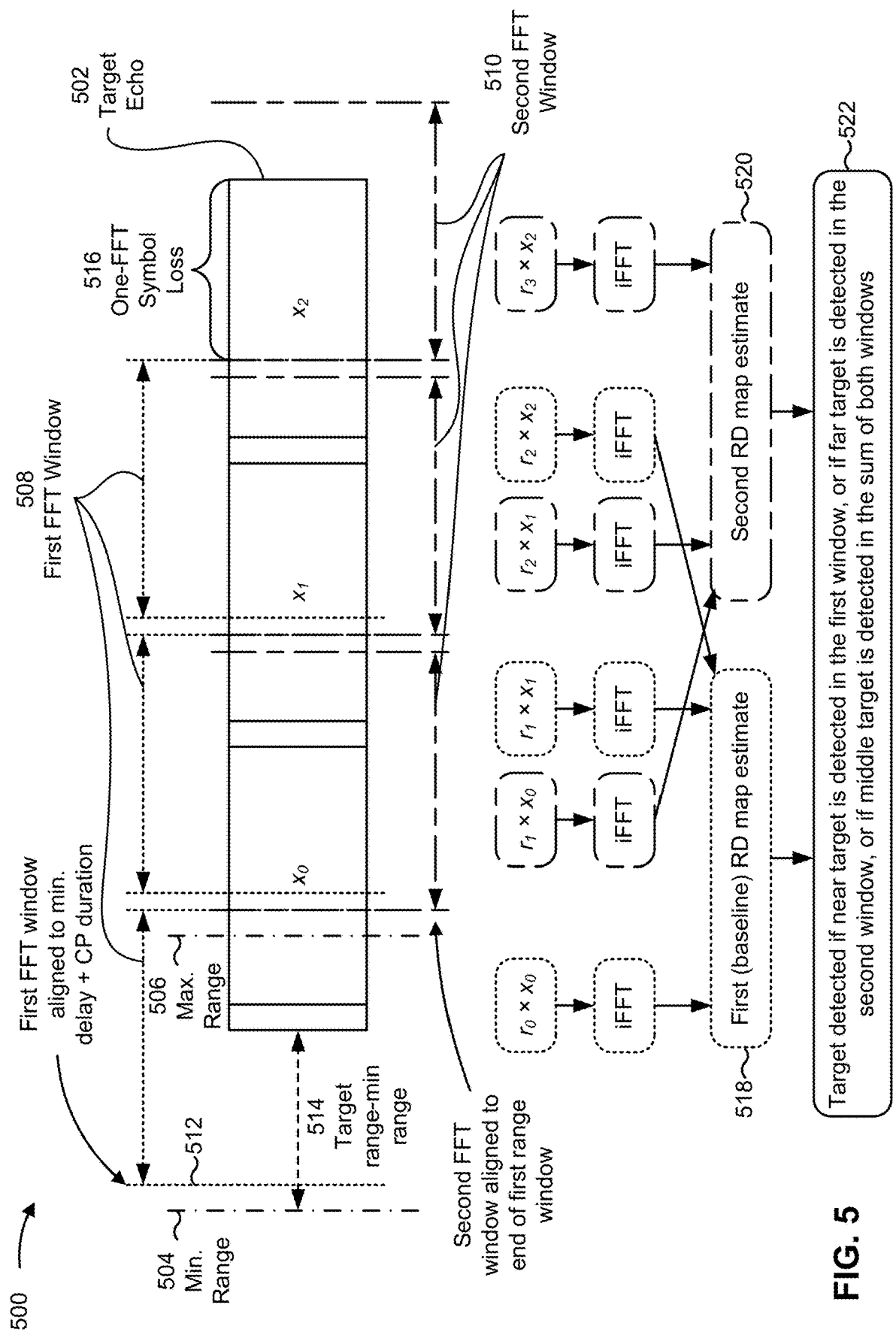
FIG. 5 is a diagram illustrating an example of a cyclic-prefix orthogonal frequency division multiplexing waveform for radar sensing, in accordance with the present disclosure.

FIG. 5 is a diagram illustrating an example 500 of a CP-OFDM waveform for radar sensing, in accordance with the present disclosure.

In some examples, CP-OFDM data may be used for radar sensing. In such cases, if the symbol length is less than the radar channel delay spread used for radar sensing, multi-FFT per symbol algorithms may be used for radar detection and estimation. In some instances, using multi-FFT per symbol algorithms may meet radar range requirements of 300 meters in a single-target scenario with a signal-to-interference-plus-noise ratio (SINR) of at least 15 decibels (dB). Moreover, in some cases, radar sensing using a data part of a CP-OFDM waveform may result in enhanced JCR performance as compared to radar sensing using a TDM waveform.

More particularly, as shown in FIG. 5, and as indicated by reference number 502, a JCR system may use a CP-OFDM waveform for radar sensing, shown in FIG. 5 as a target echo returning from one or more targets. In this example, three CP-OFDM symbols are shown for illustrative purposes, labeled as $x_0$, $x_1$, and $x_2$, but, in some other examples, more or fewer CP-OFDM symbols may be used without departing from the scope of the disclosure. As shown by reference numbers 504 and 506, the JCR system may be associated with a minimum target range and a maximum target range. The line accompanying the minimum target range (indicated by reference number 504) represents a time at which the sensing signal (e.g., the CP-OFDM symbols) would return to the JCR device if the target echo were returning from a target located a minimum distance away from the JCR device, while the line accompanying the maximum target range (indicated by reference number 506) represents a time at which the sensing signal would return to the JCR device if the target echo were returning from a target located a maximum distance away from the JCR device.

In the case of a multi-FFT per symbol algorithm, the JCR device may sense for target echoes using two FFT windows: a first FFT window (shown by reference number 508) and a second FFT window (shown by reference number 510). The first FFT window may be similar to an FFT window used during a single FFT per symbol algorithm. Namely, the first FFT window may be associated with one-tap frequency domain equalization (FDE) with a single-FFT window per symbol, such as the three instances of the first FFT windows indicated by reference number 508 corresponding to the three CP-OFDM symbols $x_0$, $x_1$, and $x_2$. The first FFT window may be aligned to a period of time that corresponds to the minimum target range (indicated by reference number 504) plus a duration of the CP associated with the corresponding CP-OFDM symbol, which is schematically indicated by the line shown by reference number 512. In this way, the first FFT window may sense target echoes returning from a target located the minimum distance away from the JCR device.

However, if any targets are located further from the JCR device than the minimum distance, the first FFT window may not fully capture the reflected signals. For example, as shown in FIG. 5 by reference number 514, in this example a target range is farther away than a minimum range (e.g., the reflected CP-OFDM symbols return to the JCR device at a time later than a time corresponding to the minimum range). In such cases, if only the first FFT window is used by the JCR device, then a portion of the reflected signal may be lost (e.g., not sensed by the JCR device). More particularly, as indicated by reference number 516, a portion of the CP-OFDM symbol indexed as $x_2$ is not captured by the first FFT window.

Accordingly, in some examples, a second FFT window may be used in order to fully capture return signals, which may be aligned such that the second FFT window may sense returns occurring after the first FFT window. More particularly, for a $k^{th}$ symbol, a second FFT window may start where a first FFT window corresponding to the $k^{th}$ symbol ends to fully capture the received $k^{th}$ symbol. More particularly, in the example shown in FIG. 5, the third instance of the second FFT window may capture the portion of the CP-OFDM symbol indexed as $x_2$ that the first FFT window may miss (e.g., the portion indicated by reference number 516).

In some examples, the signals received by the first FFT window and the second FFT window may then be used to create multiple range-Doppler (RD) map estimates in order to detect one or more targets. More particularly, as indicated by reference number 518, a first RD map estimate may be determined using the signals received in the first FFT window (e.g., by multiplying, in the FFT domain and for each $k^{th}$ symbol, the received signal, $r_k$, by the transmitted signal, $x_k$, and then determining the iFFT of the product of the received signal and the transmitted signal). Similarly, as indicated by reference number 520, a second RD map estimate may be determined using the signals received in the second FFT window (e.g., by multiplying, in the FFT domain and for each $k^{th}$ symbol, the received signal, $r_{k+1}$, by the transmitted signal, $x_k$, and then determining the iFFT of the product of the received signal and the transmitted signal). Together, the first RD map estimate and the second RD map estimate may be used to detect targets located between the minimum and maximum target range, such as by detecting near targets in the first FFT window, by detecting far targets in the second FFT window, and/or by detecting middle targets in the sum of both the first FFT window and the second FFT window, as indicated by reference number 522.

More particularly, in some examples, the first RD map estimate may have high target SINR for small ranges (with delay bin (d) less than $\frac{1}{4}^{th}$ of FFT size ($M_{FFT}$); e.g., d<G $M_{FFT}/4$), the second RD map estimate may have high SINR for large ranges (e.g., d>3M FFT/4), and the RD map estimate obtained by adding the first RD map estimate and the second RD map estimate may have high target SINR for medium ranges (e.g., $M_{FFT}/4$<d<$3M_{FFT}/4$). In some cases, using a JCR system (such as by using the multi-FFT algorithm based CP-OFDM waveform described above) may result in an increased operational region as compared to a TDM-based radar system. An operational region of a radar scheme may refer to a set of pairs of communication rate (sometimes referred to as communication link capacity) and detection range (sometimes referred to as sensing range). When factors such as time resources, frequency resources, transmission power, or the like, remain constant across the two schemes, the JCR system may exhibit a uniformly better operational range than a TDM system, irrespective of communication direction, sensing direction, and/or similar factors.

However, employing JCR systems utilizing multi-FFT algorithms per symbol or the like may suffer certain drawbacks. For example, millimeter wave radar based on traditional communication hardware with analog beamforming may suffer from high latency for high-resolution sensing in the angular domain with a wide field of view (FoV). Moreover, although JCR systems employing fully digital beamforming using high-speed ADCs and/or large antenna arrays may result in high-resolution sensing with a wide FoV, low latency, and high communication data rates, such architecture requires complex hardware and leads to high power, computing, and other resource consumption, making such systems impractical for many applications.

Some techniques and apparatuses described herein enable high-resolution sensing and large communication data rates coupled with low power, computing, and other resource consumption, and low hardware cost, by employing a distributed sensing procedure using low-resolution ADCs. More particularly, in some aspects, a network controller (e.g., a network node 110, a network controller 130, or the like) or similar network device may receive capability information and/or feedback information from a number of distributed UEs (e.g., UEs 120) capable of performing a distributed sensing procedure. The network controller may select a subset of the UEs to include in a distributed sensing cluster, and may transmit configuration parameters to the subset of UEs, such as an indication of a low-resolution ADC setting to be used during a distributed sensing procedure. The subset of UEs may perform the distributed sensing procedure based at least in part on the configuration parameters (e.g., the low-resolution ADC setting) and transmit sensing information to the network controller. The network controller may then aggregate the sensing output from the subset of UEs to determine an aggregate sensing result. In this way, the network controller may achieve high-resolution sensing and large communication data rates using low-resolution ADCs, resulting in low latency, high communication data rates, reduced power, computing, and other resource consumption, and overall more efficient usage of network resources.

As indicated above, FIG. 5 is provided as an example. Other examples may differ from what is described with respect to FIG. 5.

Figure 6:
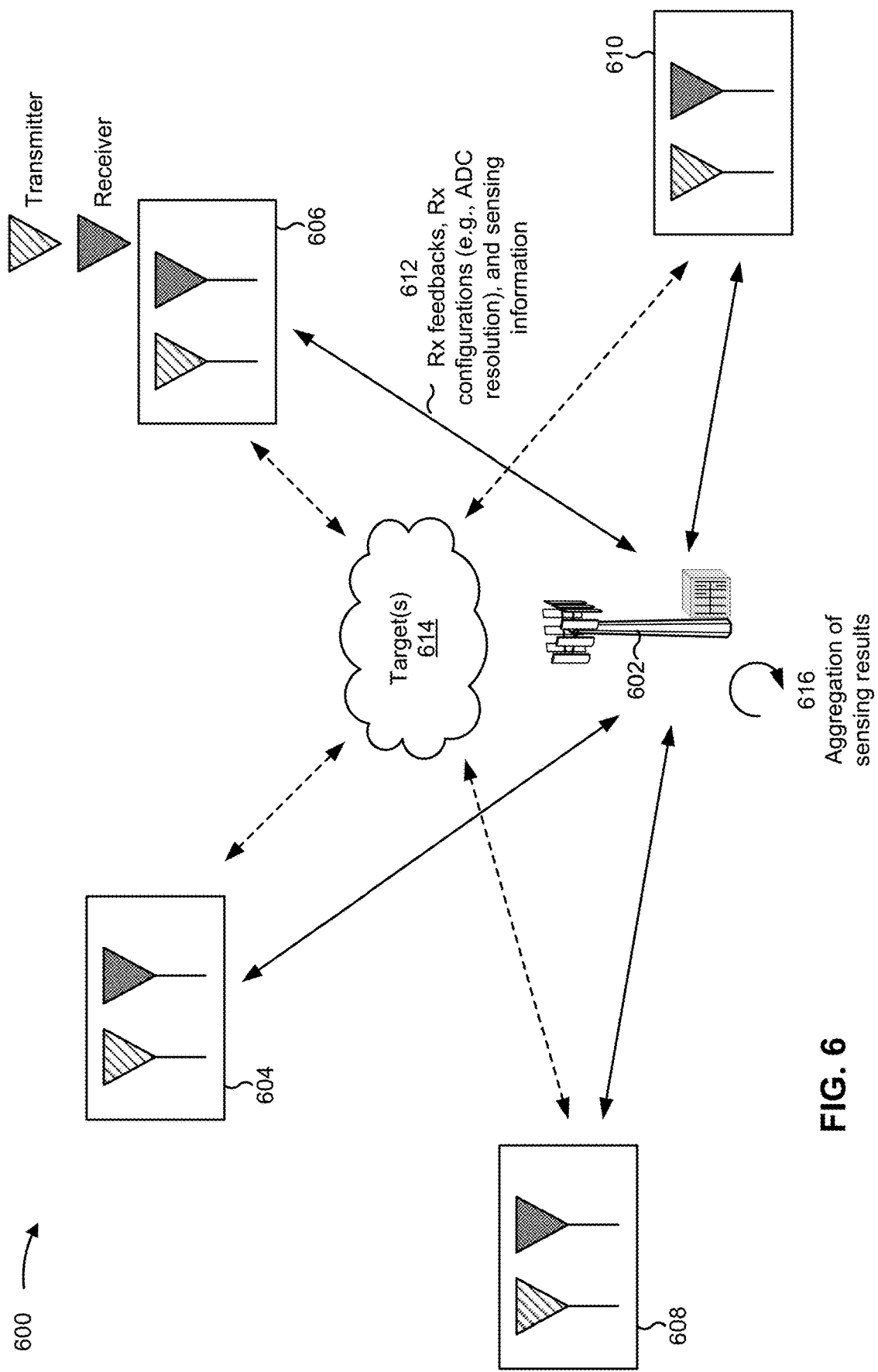
FIG. 6 is a diagram illustrating an example associated with distributed sensing using JCR with low-resolution analog-to-digital converters, in accordance with the present disclosure.

FIG. 6 is a diagram illustrating an example 600 associated with distributed sensing using JCR with low-resolution ADCs, in accordance with the present disclosure. As shown using unbroken lines in FIG. 6, example 600 includes communication between a centralized network controller 602 (e.g., a network node 110, a network controller 130, or a similar network device) and multiple distributed sensing units 604, 606, 608, 610 (e.g., UEs 120). In some aspects, the centralized network controller 602 and the distributed sensing units 604, 606, 608, 610 may be included in a wireless network, such as wireless network 100. The network controller 602 and the distributed sensing units 604, 606, 608, 610 may communicate via respective wireless access links, which may include an uplink and a downlink.

Moreover, in some aspects, in addition to performing communication operations (such as with the network controller 602), the distributed sensing units 604, 606, 608, 610 may be capable of performing sensing and/or radar operations, indicated using broken lines in FIG. 6. For example, in some examples, each of the distributed sensing units 604, 606, 608, 610 may be associated with one of the JCR systems described above in connection with FIG. 4. As shown in FIG. 6, each of the distributed sensing units 604, 606, 608, 610 may be capable of monostatic sensing (e.g., each of the distributed sensing units 604, 606, 608, 610 may include a co-located transmitter and receiver capable of transmitting and receiving sensing signals). However, aspects of the disclosure are not so limited. In some other aspects, one or more of the distributed sensing units 604, 606, 608, 610 may be associated with multi-static sensing capabilities, in which one or more of the distributed sensing units 604, 606, 608, 610 may include only a transmitter and/or may only be associated with transmitting capabilities, and in which one or more of the distributed sensing units 604, 606, 608, 610 may include only a receiver and/or may only be associated with receiving capabilities. In such aspects, two or more of the distributed sensing units 604, 606, 608, 610 may cooperatively perform a sensing operation (e.g., one or more of the distributed sensing units 604, 606, 608, 610 may transmit a sensing signal, and another one or more of the distributed sensing units 604, 606, 608, 610 may receive returns of the sensing signal).

As described above in connection with FIG. 5, in some cases, sensing performance using JCR systems containing cost-effective, fully digital communication units with low-resolution ADCs may be poor. For example, a single monostatic sensing unit (e.g., one of the distributed sensing units 604, 606, 608, 610) associated with 32 antennas and employing low-resolution ADCs may only result in three to four degrees of resolution with limited dynamic range. This may be insufficient for many sensing applications, which often require one degree of resolution and up to a 300-meter range. As used herein, a "low-resolution ADC" may refer to an ADC having a resolution of six or less bits.

In some aspects, in order to overcome this poor sensing performance, multiple distributed sensing units (e.g., the distributed sensing units 604, 606, 608, 610) employing low-resolution ADCs may cooperatively perform a distributed sensing procedure, resulting in an improved degree of resolution and greater dynamic range. Put another way, aspects of the disclosure enable distributed sensing with widely separated JCR units that support configurable low-resolution ADCs to enable enhanced sensing performance at low cost and power consumption. For example, as indicated by the unbroken lines in FIG. 6, and as shown by reference number 612, the network controller 602 and the distributed sensing units 604, 606, 608, 610 may communicate with each other certain parameters and/or information associated with a distributed sensing procedure. For example, each of the distributed sensing units 604, 606, 608, 610 may transmit feedback information to the network controller 602, and, based at least in part on the feedback information, the network controller 602 may transmit configuration parameters for the distributed sensing procedure back to the distributed sensing units 604, 606, 608, 610. For example, in some aspects, based at least in part on the feedback information received from the distributed sensing units 604, 606, 608, 610, the network controller 602 may determine an ADC resolution to be used during the distributed sensing procedure and/or indicate the ADC resolution to each of the distributed sensing units 604, 606, 608, 610.

In some aspects, as indicated by the broken arrows in FIG. 6, the distributed sensing units 604, 606, 608, 610 may then perform a sensing procedure based at least in part on the configuration parameters (e.g., ADC resolution) indicated by the network controller 602. More particularly, each of the distributed sensing units 604, 606, 608, 610 may sense a location of one or more targets 614 using its radar capabilities based at least in part on the configuration parameters signaled by the network controller 602. The distributed sensing units 604, 606, 608, 610 may then communicate sensing information (e.g., results of the respective sensing procedure) to the network controller 602. As shown by reference number 616, the network controller may aggregate the sensing information from the distributed sensing units 604, 606, 608, 610, which may enable spatial diversity, denoising of a range-Doppler-angular heatmap, and/or point cloud densification, among other benefits. By aggregating the sensing results from multiple distributed sensing units employing low-resolution ADCs or the like, the network controller 130 may achieve high-performance sensing (e.g., one degree of resolution and 300-meter range, or the like) without the attendant power, computing, and other resource consumption required for a JCR system employing fully digital beamforming using high-speed ADCs and/or large antenna arrays. Details of high-performance distributed sensing with low-resolution ADCs using a centralized controller are described below in connection with FIG. 7.

As indicated above, FIG. 6 is provided as an example. Other examples may differ from what is described with respect to FIG. 6.

Figure 7:
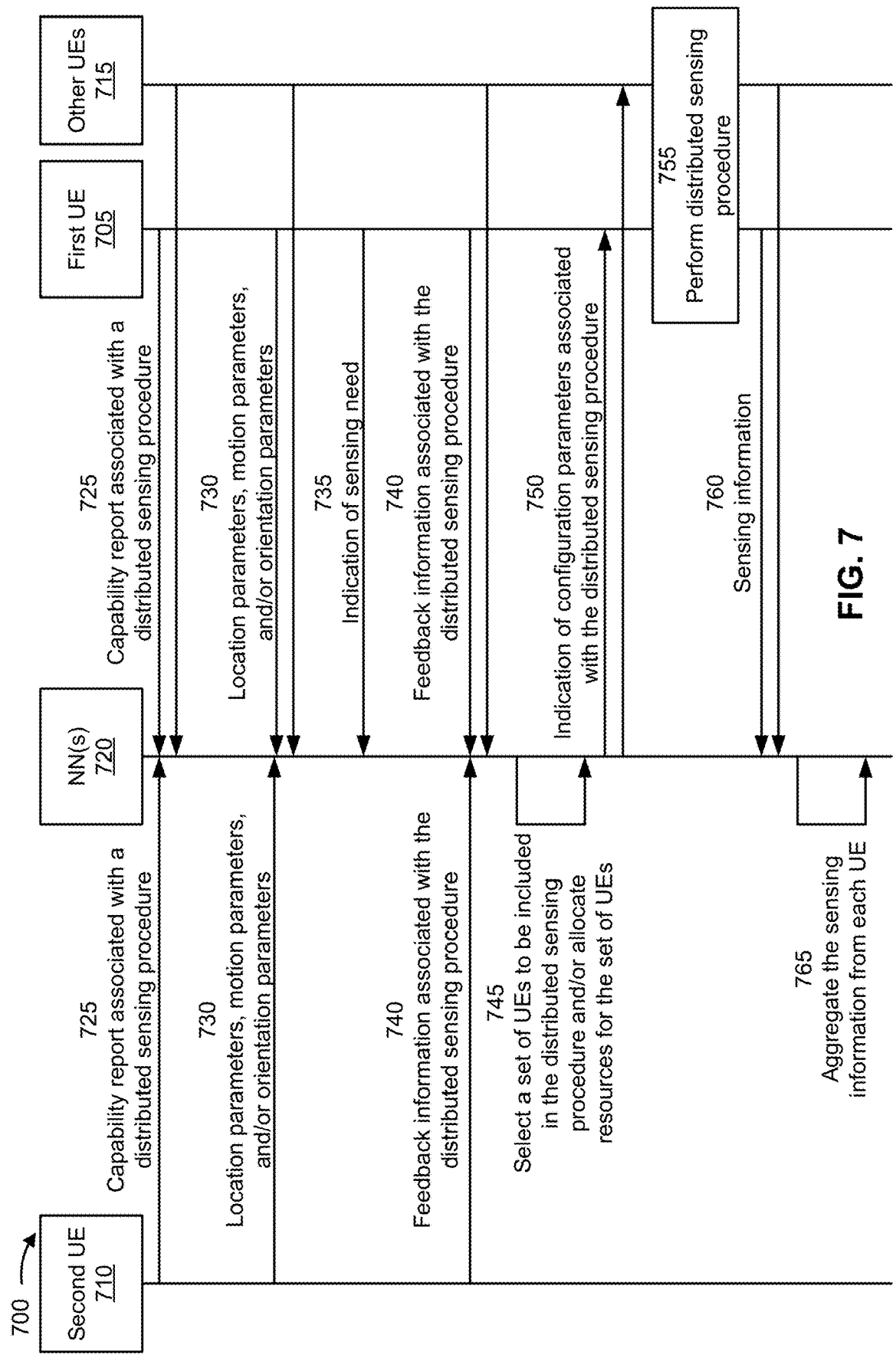
FIG. 7 is a diagram of an example associated with distributed sensing with low-resolution analog-to-digital converters, in accordance with the present disclosure.

FIG. 7 is a diagram of an example 700 associated with distributed sensing with low-resolution analog-to-digital converters, in accordance with the present disclosure. As shown in FIG. 7, multiple distributed UEs (e.g., UEs 120), such a first UE 705, a second UE 710, and/or one or more other UEs 715, may communicate with a network node 720 (e.g., a network node 110). In some aspects, the first UE 705, the second UE 710, and/or one or more other UEs 715 may correspond to the distributed sensing units 604, 606, 608, 610 described above in connection with FIG. 6. Additionally, or alternatively, in some aspects, one or more of the first UE 705, the second UE 710, and/or one or more other UEs 715 may correspond to a stationary UE, such as a roadside unit (RSU) or similar stationary UE.

Additionally, or alternatively, the network node 720 may correspond to the centralized network controller 602 described above in connection with FIG. 6. In some aspects, the first UE 705, the second UE 710, the one or more other UEs 715, and/or the network node 720 may be part of a wireless network (e.g., wireless network 100). The first UE 705, the second UE 710, and/or the one or more other UEs 715 may have established a wireless connection with the network node 720 prior to operations shown in FIG. 7. In some aspects, each of the first UE 705, the second UE 710, and the one or more other UEs 715 may be associated with a JCR system, such as one of the JCR systems described above in connection with FIG. 4.

As shown by reference number 725, the first UE 705, the second UE 710, and/or the one or more other UEs 715 may transmit, and the network node 720 may receive, a capabilities report. In some aspects, the capabilities report may indicate UE support for a distributed sensing procedure. Put another way, the network node 720 may receive, from one or more of the first UE 705, the second UE 710, and/or the one or more other UEs 715, capability information associated with a distributed sensing procedure. For example, the capability information may indicate that one or more of the first UE 705, the second UE 710, and/or the one or more other UEs 715 may be capable of performing as one of the distributed sensing units 604, 606, 608, 610 described above in connection with FIG. 6.

In some aspects, a capability report may indicate a number of antennas associated with the corresponding UE, a speed associated with an ADC associated with the corresponding UE, a number of bits associated with the ADC associated with the corresponding UE, a power consumption associated with the ADC associated with the corresponding UE, a field of view associated with the corresponding UE, or similar information. In such aspects, the network node 720 may determine optimized configuration parameters (described in more detail below in connection with reference number 750) for each UE based at least in part on the corresponding capability report.

In some aspects, the network node 720 may collect additional parameters from one or more of the first UE 705, the second UE 710, and/or the one or more other UEs 715 associated with the distributed sensing procedure and/or used to optimize configuration parameters associated with the distributed sensing procedure. For example, as shown by reference number 730, the first UE 705, the second UE 710, and/or the one or more other UEs 715 may transmit, and the network node 720 may receive, location parameters (e.g., information indicating a respective location of the corresponding UE), motion parameters (e.g., information indicating a speed or similar parameter associated with a movement of the corresponding UE), and/or orientation parameters (e.g., information indicating a relative position of the corresponding UE).

As shown by reference number 735, in some aspects, at least one of the UEs (e.g., the first UE 705 in the example depicted in FIG. 7) may transmit, and the network node 720 may receive, information associated with a sensing need of the at least one UE. For example, the first UE 705 may have a sensing need that the first UE 705 is not capable of performing alone due to power and/or ADC requirements, and/or a sensing need that, if performed solely by the first UE 705, would require high power, computing, and other resource consumption, as described above in connection with FIG. 5. Accordingly, in some aspects, the first UE 705 may transmit an indication of the sensing need to the network node 720 in order to trigger a distributed sensing procedure (e.g., the distributed sensing procedure described above in connection with FIG. 6), or a similar procedure. In some aspects, as described in more detail below in connection with reference numbers 745 and 750, the network node 720 may determine one or more distributed sensing cluster parameters based at least in part on the indication of the sensing need, such as which sensing parameters to estimate, which targets to track (which may be known by coarse estimation performed by the first UE 705 or another individual sensing unit), how much tracking accuracy is necessary to accomplish the sensing task, an ADC resolution associated with the sensing task, a detection performance (e.g., a coarse detection performance or a fine detection performance) associated with the sensing task, or the like. For example, if the network node 720 determines that only a relatively coarse detection performance is necessary to complete the sensing task, the network node 720 may use low-resolution ADCs for the distributed sensing procedure, and if the network node 720 determines that a relatively fine detection performance is necessary to complete the sensing task, the network node 720 may use high-resolution ADCs for the distributed sensing procedure.

As shown by reference number 740, in some aspects, the first UE 705, the second UE 710, and/or the one or more other UEs 715 may transmit, and the network node 720 may receive, feedback information associated with the distributed sensing procedure. In some aspects, the feedback information may include information used by the network node 720 to determine a set of UEs to be included in the distributed sensing procedure and/or used by the network node 720 to determine certain configuration parameters to be used by the set of the UEs when performing the distributed sensing procedure. For example, in some aspects, the feedback information may indicate a sparsity ratio associated with a sensing channel. In such aspects, if the sensing channel is relatively sparse, a relatively low ADC resolution may be used for the distributed sensing procedure. Conversely, if the sensing channel is relatively congested, a relatively high ADC resolution may be needed for the distributed sensing procedure.

Additionally, or alternatively, in some aspects, the feedback information may indicate a dynamic range associated with the sensing channel. For example, if the sensing channel includes only a small object (e.g., a pedestrian, or the like), the network node 720 may determine that a relatively low ADC resolution may be used for the distributed sensing procedure. Conversely, if the sensing channel includes both a small object (e.g., a pedestrian, or the like) and a large object (e.g., a truck), a relatively high ADC resolution may be needed for the distributed sensing procedure. Additionally, or alternatively, the feedback information may indicate a coarse target distribution associated with the sensing channel and/or a radar cross-section (RCS) pattern in range-Doppler-angle domain. In such aspects, if the coarse target distribution and/or RCS pattern indicate a point target in the sensing channel, the network node 720 may determine that a relatively low ADC resolution may be used for the distributed sensing procedure. Conversely, if the coarse target distribution and/or RCS pattern indicate an extended target with large dimensions, a relatively high ADC resolution may be needed for the distributed sensing procedure and/or more widely separated sensing units may be needed for exploiting spatial diversity.

Additionally, or alternatively, in some aspects, the feedback information may indicate one or more path loss model parameters associated with the sensing channel. In such aspects, the higher the path loss, the higher the ADC resolution that may be needed for the distributed sensing procedure to enable a large dynamic range. Additionally, or alternatively, in some aspects, the feedback information may indicate one or more interference measurements associated with the sensing channel. In such aspects, the larger the interference, the higher the ADC resolution that may be needed for the distributed sensing procedure to enable a large dynamic range and/or to enable enhanced target detection performance at long ranges.

As shown by reference number 745, the network node 720 may select, based at least in part on the feedback information, a set of UEs to be included in the distributed sensing procedure (sometimes referred to as a distributed sensing cluster). In some aspects, the set of UEs (e.g., the distributed sensing cluster) may be further selected based at least in part on the capability information described above in connection with reference number 725; the location, motion, and/or orientation parameters described above in connection with reference number 730; and/or the indication of the sensing need described above in connection with reference number 735.

In some aspects, the distributed sensing cluster may include less than all of the UEs from which the network node 720 received feedback information. For example, in the example depicted in FIG. 7, the network node 720 may select the first UE 705 and one or more of the other UEs 715 to be included in the distributed sensing cluster, but the network node 720 may not select the second UE 710 to be included in the distributed sensing cluster. Additionally, or alternatively, in some aspects, the network node 720 may be a gNB or similar network node (or else one or more components thereof, such as a CU, a DU, or an RU), and/or each UE of the distributed sensing cluster may be an RSU. In some aspects, selecting which UEs to include in the distributed sensing cluster may include the network node 720 performing a tradeoff between the number of sensing units included in the cluster and an ADC resolution used per unit (e.g., the more UEs included in the distributed sensing cluster, the lower the ADC resolution that may be used by each UE).

Additionally, or alternatively, in the operations shown in connection with reference number 745, the network node 720 may allocate resources to each UE, of the set of UEs (e.g., the distributed sensing cluster), for performing the distributed sensing procedure. Moreover, in some aspects, the network node 720 may allocate resources to each UE, of the set of UEs, in multiple resource allocation stages. For example, the network node 720 may allocate a corresponding first set of resources to each UE for performing a first (e.g., coarse) sensing procedure, and then may allocate a corresponding second set of resources to each UE for performing a second (e.g., fine) sensing procedure. Similarly, in some aspects, the network node 720 may select the set of UEs (e.g., the distributed sensing cluster) in one selection procedure, while, in some other aspects, the network node 720 may select the set of UEs using multiple and/or iterative selection procedures. For example, in some aspects, the network node 720 may select a first set of UEs for performing the distributed sensing procedure, and then the network node 720 may later select a second set of UEs (which, in some aspects, may be a subset of the first set of UEs) for performing a second (e.g., a refined) distributed sensing procedure. In some aspects, the second set of UEs may be selected based at least in part on sensing information receiving from the first set of UEs (which is described in more detail below in connection with reference number 760), a change in the sensing channel or environment, an occurrence or an event (e.g., movement of a target and/or a sensing unit), or the like.

Additionally, or alternatively, the network node 720 may select one or more configuration parameters associated with each of the set of UEs associated with the distributed sensing procedure. For example, the network node 720 may select an ADC resolution associated with the distributed sensing procedure, an ADC speed associated with the distributed sensing procedure, an automatic gain control (AGC) setting associated with the distributed sensing procedure, a transmission power associated with the distributed sensing procedure, one or more joint waveform and/or beamforming parameters associated with the distributed sensing procedure, and/or a type of reception processing associated with the distributed sensing procedure (e.g., coherent or non-coherent, centralized or distributed, or the like), among other examples. In some aspects, the configuration parameters may vary between UEs of the distributed sensing cluster (e.g., a first UE may be configured with a first ADC resolution, a first ADC speed, a first AGC setting, a first transmission power, a first waveform/beamforming parameter, and/or a first reception processing parameter, among other examples; and a second UE may be configured with a second ADC resolution, a second ADC speed, a second AGC setting, a second transmission power, a second waveform/beamforming parameter, and/or a second reception processing parameters among other examples).

As shown by reference number 750, the network node 720 may transmit, and one or more UEs (e.g., the UEs included in the distributed sensing cluster) may receive, configuration information. In some aspects, the one or more UEs may receive the configuration information via one or more of RRC signaling, one or more MAC control elements (MAC-CEs), and/or downlink control information (DCI), among other examples. In some aspects, the configuration information may include an indication of one or more configuration parameters (e.g., already known to the one or more UEs and/or previously indicated by the network node 720 or other network device) for selection by the one or more UEs, and/or explicit configuration information for the one or more UEs to use to configure the one or more UEs, among other examples.

More particularly, in some aspects, the network node 720 may transmit, and the set of UEs (e.g., the distributed sensing cluster) may receive, an indication of configuration parameters associated with the distributed sensing procedure. As described above in connection with reference number 745, in some aspects, the configuration parameters associated with the distributed sensing procedure may be based at least in part on the capability information described above in connection with reference number 725. Additionally, or alternatively, in some aspects, the configuration parameters associated with the distributed sensing procedure may be based at least in part on the location parameters, the motion parameters, and/or the orientation parameters described above in connection with reference number 730. Additionally, or alternatively, in some aspects, the configuration parameters associated with the distributed sensing procedure may be based at least in part on the information associated with the sensing need of the at least one UE described above in connection with reference number 735. Additionally, or alternatively, in some aspects, the configuration parameters associated with the distributed sensing procedure may be based at least in part on the feedback information described above in connection with reference number 740.

As described above in connection with reference number 745, in some aspects, the network node 720 may select a low-resolution ADC setting associated with the distributed sensing procedure. Accordingly, in such aspects, the network node 720 may transmit, and the set of UEs may receive, an indication of the low-resolution ADC setting (e.g., in some aspects, the configuration parameters may include an indication the ADC resolution associated with the distributed sensing procedure). Additionally, or alternatively, in some aspects, the configuration parameters may include an ADC speed associated with the distributed sensing procedure. Additionally, or alternatively, in some aspects, the configuration parameters may include an AGC setting associated with the distributed sensing procedure. Additionally, or alternatively, in some aspects, the configuration parameters may include a transmission power setting associated with the distributed sensing procedure. Additionally, or alternatively, in some aspects, the configuration parameters may include joint waveform parameters associated with the distributed sensing procedure. Additionally, or alternatively, in some aspects, the configuration parameters may include joint beamforming parameters associated with the distributed sensing procedure. Additionally, or alternatively, in some aspects, the configuration parameters may include a type of waveform associated with the distributed sensing procedure. Moreover, in aspects in which the network node 720 allocates resources to each UE, of the set of UEs (e.g., the distributed sensing cluster), for performing the distributed sensing procedure, the configuration parameters may include an indication of the resources.

The set of UEs (e.g., the distributed sensing cluster) may configure themselves based at least in part on the configuration information. In some aspects, the set of UEs may be configured to perform one or more operations described herein based at least in part on the configuration information. More particularly, as shown by reference number 755, the first UE 705 and/or the one or more of the other UEs 715 (e.g., distributed sensing cluster) may perform the distributed sensing procedure based at least in part on the configuration parameters. For example, the first UE 705 and/or the one or more of the other UEs 715 may each sense a location of one or more targets (such as the one or more targets 614) using a low-resolution ADC setting (e.g., an ADC setting associated with six or less bits), in a similar manner as described in connection with the distributed sensing units 604, 606, 608, 610 of FIG. 6.

As shown by reference number 760, each of the first UE 705 and/or the one or more of the other UEs 715 (e.g., each UE of the distributed sensing cluster) may transmit, and the network node 720 may receive, an indication of sensing information associated with the distributed sensing procedure. In some aspects, the sensing information may be sensing results associated with a sensing procedure performed by the corresponding UE using the corresponding configuration parameters described in connection with reference number 750. In some aspects, the set of UEs may perform distributed processing of the sensing results, while, in some other aspects, the network node 720 may perform centralized processing of the sensing results. More particularly, in distributed-processing aspects, each UE, of the set of UEs, may transmit a processed channel parameter associated with the distributed sensing procedure, an ADC resolution associated with the distributed sensing procedure, and/or an ADC speed associated with the distributed sensing procedure. The network node 720 may then aggregate the processed parameters from each distributed UE, as described in more detail below in connection with reference number 765. Conversely, in centralized-processing aspects, the sensing information received from each distributed UE may include raw data associated with the distributed sensing procedure, an ADC resolution associated with the distributed sensing procedure, and/or an ADC speed associated with the distributed sensing procedure. The network node 720 may then process the raw data and aggregate the processed data, as described in more detail below in connection with reference number 765.

More particularly, as shown by reference number 765, the network node 720 may aggregate the sensing information from each UE, of the set of UEs (e.g., the first UE 705 and/or the one or more of the other UEs 715), to create an aggregated sensing result, in a similar manner as described above in connection with FIG. 6. Moreover, in distributed-processing aspects, the network node 720 may aggregate processed parameters from each UE to create the aggregated sensing result, while, in centralized-processing aspects, the network node 720 may first process the raw data received from each UE and then aggregate processed data to create the aggregated sensing result. Moreover, as described above in connection with reference number 745, in some aspects, the network node 720 may iteratively select UEs to be included in the set of UEs (e.g., the distributed sensing cluster). Accordingly, in some aspects, the network node 720 may decide which UEs to include in the next distributed sensing cluster and/or what low-resolution ADC setting should be used for the next distributed sensing cluster based at least in part on the sensing information and/or the aggregated sensing result.

Based at least in part on the network node 720, the first UE 705, the second UE 710, and/or the one or more other UEs 715 performing a distributed sensing procedure using low-resolution ADCs as described above, the network node 720, the first UE 705, the second UE 710, and/or the one or more other UEs 715 may conserve computing, power, network, and/or communication resources that may have otherwise been consumed by traditional sensing processes. For example, based at least in part on the network node 720, the first UE 705, the second UE 710, and/or the one or more other UEs 715 performing a distributed sensing procedure using low-resolution ADCs, the network node 720, the first UE 705, the second UE 710, and/or the one or more other UEs 715 may achieve high-resolution sensing and large communication data rates using low-resolution ADCs, resulting in low latency, high communication data rates, reduced power, computing, and other resource consumption, and overall more efficient usage of network resources.

As indicated above, FIG. 7 is provided as an example. Other examples may differ from what is described with respect to FIG. 7.

Figure 8:
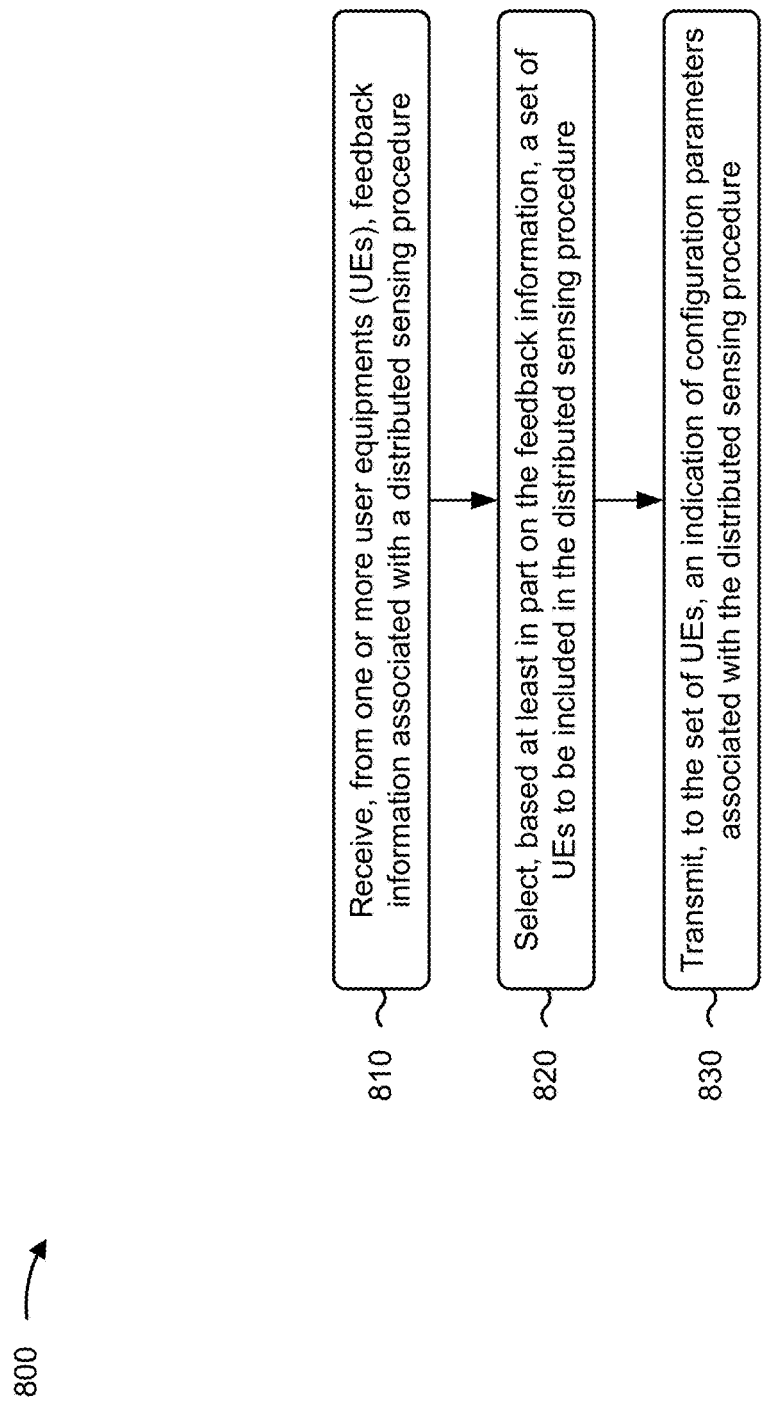
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 720) performs operations associated with distributed sensing with low-resolution ADCs.

As shown in FIG. 8, in some aspects, process 800 may include receiving, from one or more UEs, feedback information associated with a distributed sensing procedure (block 810). For example, the network node (e.g., using communication manager 150 and/or reception component 1002, depicted in FIG. 10) may receive, from one or more UEs, feedback information associated with a distributed sensing procedure, as described above.

As further shown in FIG. 8, in some aspects, process 800 may include selecting, based at least in part on the feedback information, a set of UEs to be included in the distributed sensing procedure (block 820). For example, the apparatus (e.g., using communication manager 150 and/or selection component 1008, depicted in FIG. 10) may select, based at least in part on the feedback information, a set of UEs to be included in the distributed sensing procedure, as described above.

As further shown in FIG. 8, in some aspects, process 800 may include transmitting, to the set of UEs, an indication of configuration parameters associated with the distributed sensing procedure (block 830). For example, the apparatus (e.g., using communication manager 150, transmission component 1004, and/or configuration component 1010, depicted in FIG. 10) may transmit, to the set of UEs, an indication of configuration parameters associated with the distributed sensing procedure, as described above.

Process 800 may include additional aspects, such as any single aspect or any combination of aspects described below and/or in connection with one or more other processes described elsewhere herein.

In a first aspect, process 800 includes selecting a low-resolution ADC setting associated with the distributed sensing procedure, and transmitting, to the set of UEs, an indication of the low-resolution ADC setting.

In a second aspect, alone or in combination with the first aspect, the feedback information includes an indication of at least one of a sparsity ratio associated with a sensing channel, a dynamic range associated with the sensing channel, a coarse target distribution associated with the sensing channel, a radar cross-section associated with the sensing channel, one or more path loss model parameters associated with the sensing channel, or one or more interference measurements associated with the sensing channel.

In a third aspect, alone or in combination with one or more of the first and second aspects, process 800 includes receiving, from each UE, of the set of UEs, capability information associated with the distributed sensing procedure, wherein the configuration parameters associated with the distributed sensing procedure are based at least in part on the capability information.

In a fourth aspect, alone or in combination with one or more of the first through third aspects, the capability information indicates at least one of a number of antennas associated with the UE, a speed associated with an ADC associated with the UE, a number of bits associated with the ADC, a power consumption associated with the ADC, or a field of view associated with the UE.

In a fifth aspect, alone or in combination with one or more of the first through fourth aspects, process 800 includes receiving, from at least one UE, of the set of UEs, information associated with a sensing need of the at least one UE, wherein the configuration parameters associated with the distributed sensing procedure are based at least in part on the information associated with the sensing need of the at least one UE.

In a sixth aspect, alone or in combination with one or more of the first through fifth aspects, process 800 includes receiving, from each UE, of the set of UEs, an indication of at least one of a location associated with the UE, motion parameters associated with the UE, or an orientation associated with the UE.

In a seventh aspect, alone or in combination with one or more of the first through sixth aspects, at least one UE, of the set of UEs, is a roadside unit.

In an eighth aspect, alone or in combination with one or more of the first through seventh aspects, the configuration parameters include an indication of one or more of an ADC resolution associated with the distributed sensing procedure, an ADC speed associated with the distributed sensing procedure, an automatic gain control setting associated with the distributed sensing procedure, or a transmission power setting associated with the distributed sensing procedure.

In a ninth aspect, alone or in combination with one or more of the first through eighth aspects, the configuration parameters include an indication of at least one of joint waveform parameters associated with the distributed sensing procedure, joint beamforming parameters associated with the distributed sensing procedure, or a type of waveform associated with the distributed sensing procedure.

In a tenth aspect, alone or in combination with one or more of the first through ninth aspects, process 800 includes allocating resources to each UE, of the set of UEs, for performing the distributed sensing procedure, wherein the configuration parameters include an indication of the resources.

In an eleventh aspect, alone or in combination with one or more of the first through tenth aspects, process 800 includes receiving, from each UE, of the set of UEs, an indication of sensing information associated with the distributed sensing procedure, and aggregating the sensing information from each UE, of the set of UEs, to create an aggregated sensing result.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
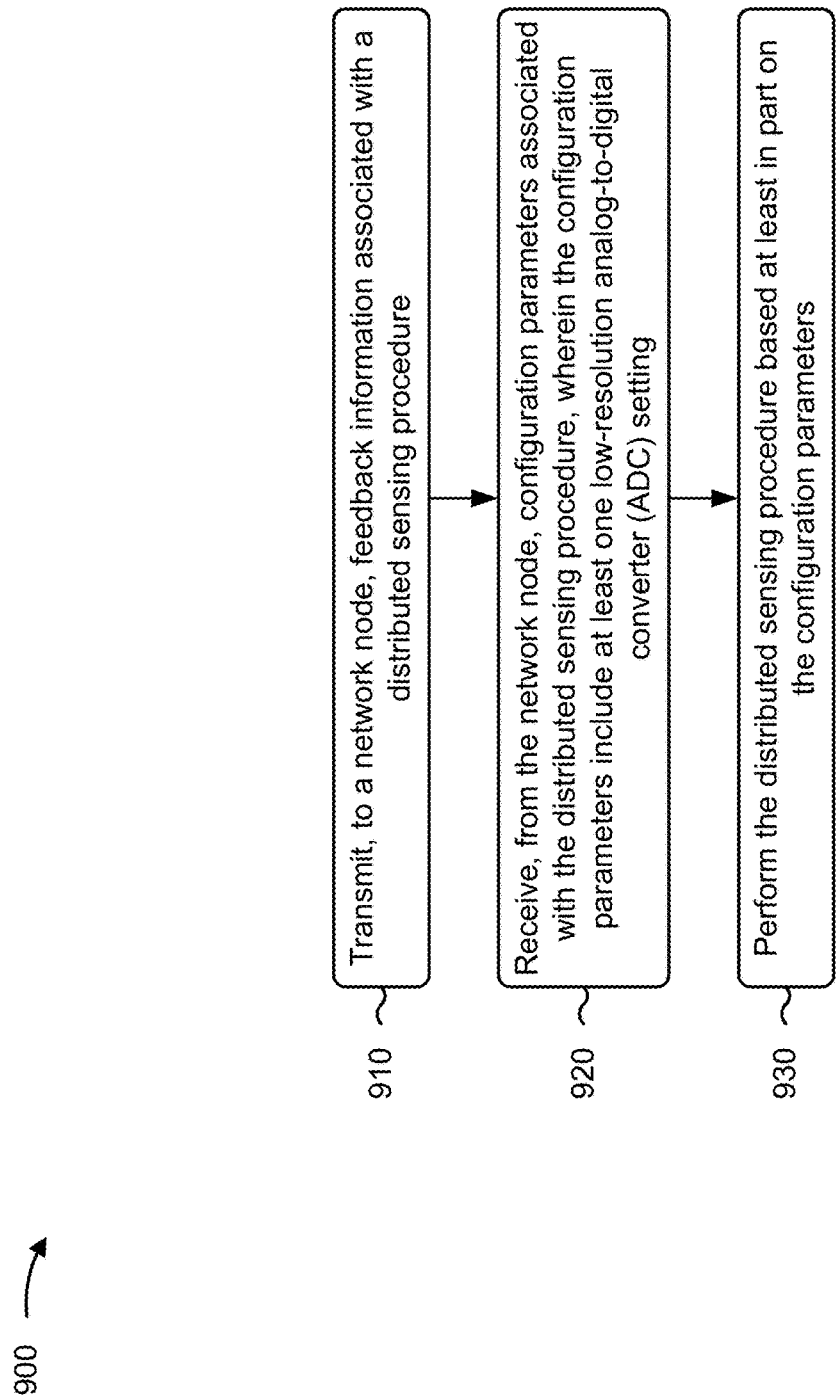
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., a UE 120, the first UE 705, or a similar UE) performs operations associated with distributed sensing with low-resolution ADCS.

As shown in FIG. 9, in some aspects, process 900 may include transmitting, to a network node, feedback information associated with a distributed sensing procedure (block 910). For example, the UE (e.g., using communication manager 140 and/or transmission component 1104, depicted in FIG. 11) may transmit, to a network node, feedback information associated with a distributed sensing procedure, as described above.

As further shown in FIG. 9, in some aspects, process 900 may include receiving, from the network node, configuration parameters associated with the distributed sensing procedure, wherein the configuration parameters include at least one low-resolution ADC setting (block 920). For example, the apparatus (e.g., using communication manager 140 and/or reception component 1102, depicted in FIG. 11) may receive, from the network node, configuration parameters associated with the distributed sensing procedure, wherein the configuration parameters include at least one low-resolution ADC setting, as described above.

As further shown in FIG. 9, in some aspects, process 900 may include performing the distributed sensing procedure based at least in part on the configuration parameters (block 930). For example, the apparatus (e.g., using communication manager 140 and/or distributed sensing component 1108, depicted in FIG. 11) may perform the distributed sensing procedure based at least in part on the configuration parameters, as described above.

Process 900 may include additional aspects, such as any single aspect or any combination of aspects described below and/or in connection with one or more other processes described elsewhere herein.

In a first aspect, the feedback information includes an indication of at least one of a sparsity ratio associated with a sensing channel, a dynamic range associated with the sensing channel, a coarse target distribution associated with the sensing channel, a radar cross-section associated with the sensing channel, one or more path loss model parameters associated with the sensing channel, or one or more interference measurements associated with the sensing channel.

In a second aspect, alone or in combination with the first aspect, process 900 includes transmitting, to the network node, capability information associated with the distributed sensing procedure, wherein the configuration parameters associated with the distributed sensing procedure are based at least in part on the capability information.

In a third aspect, alone or in combination with one or more of the first and second aspects, the capability information indicates at least one of a number of antennas associated with the UE, a speed associated with an ADC associated with the UE, a number of bits associated with the ADC, a power consumption associated with the ADC, or a field of view associated with the UE.

In a fourth aspect, alone or in combination with one or more of the first through third aspects, process 900 includes transmitting, to the network node, information associated with a sensing need of the UE, wherein the configuration parameters associated with the distributed sensing procedure are based at least in part on the information associated with the sensing need of the UE.

In a fifth aspect, alone or in combination with one or more of the first through fourth aspects, process 900 includes transmitting, to the network node, an indication of at least one of a location associated with the UE, motion parameters associated with the UE, or an orientation associated with the UE.

In a sixth aspect, alone or in combination with one or more of the first through fifth aspects, the UE is a roadside unit.

In a seventh aspect, alone or in combination with one or more of the first through sixth aspects, the configuration parameters include an indication of one or more of an ADC resolution associated with the distributed sensing procedure, an ADC speed associated with the distributed sensing procedure, an automatic gain control setting associated with the distributed sensing procedure, or a transmission power setting associated with the distributed sensing procedure.

In an eighth aspect, alone or in combination with one or more of the first through seventh aspects, the configuration parameters include an indication of at least one of joint waveform parameters associated with the distributed sensing procedure, joint beamforming parameters associated with the distributed sensing procedure, or a type of waveform associated with the distributed sensing procedure.

In a ninth aspect, alone or in combination with one or more of the first through eighth aspects, process 900 includes receiving, from the network node, an indication of allocated resources for performing the distributed sensing procedure.

In a tenth aspect, alone or in combination with one or more of the first through ninth aspects, process 900 includes transmitting, to the network node, an indication of sensing information associated with the distributed sensing procedure.

In an eleventh aspect, alone or in combination with one or more of the first through tenth aspects, the sensing information includes an indication of at least one of a processed channel parameter associated with the distributed sensing procedure, an ADC resolution associated with the distributed sensing procedure, or an ADC speed associated with the distributed sensing procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
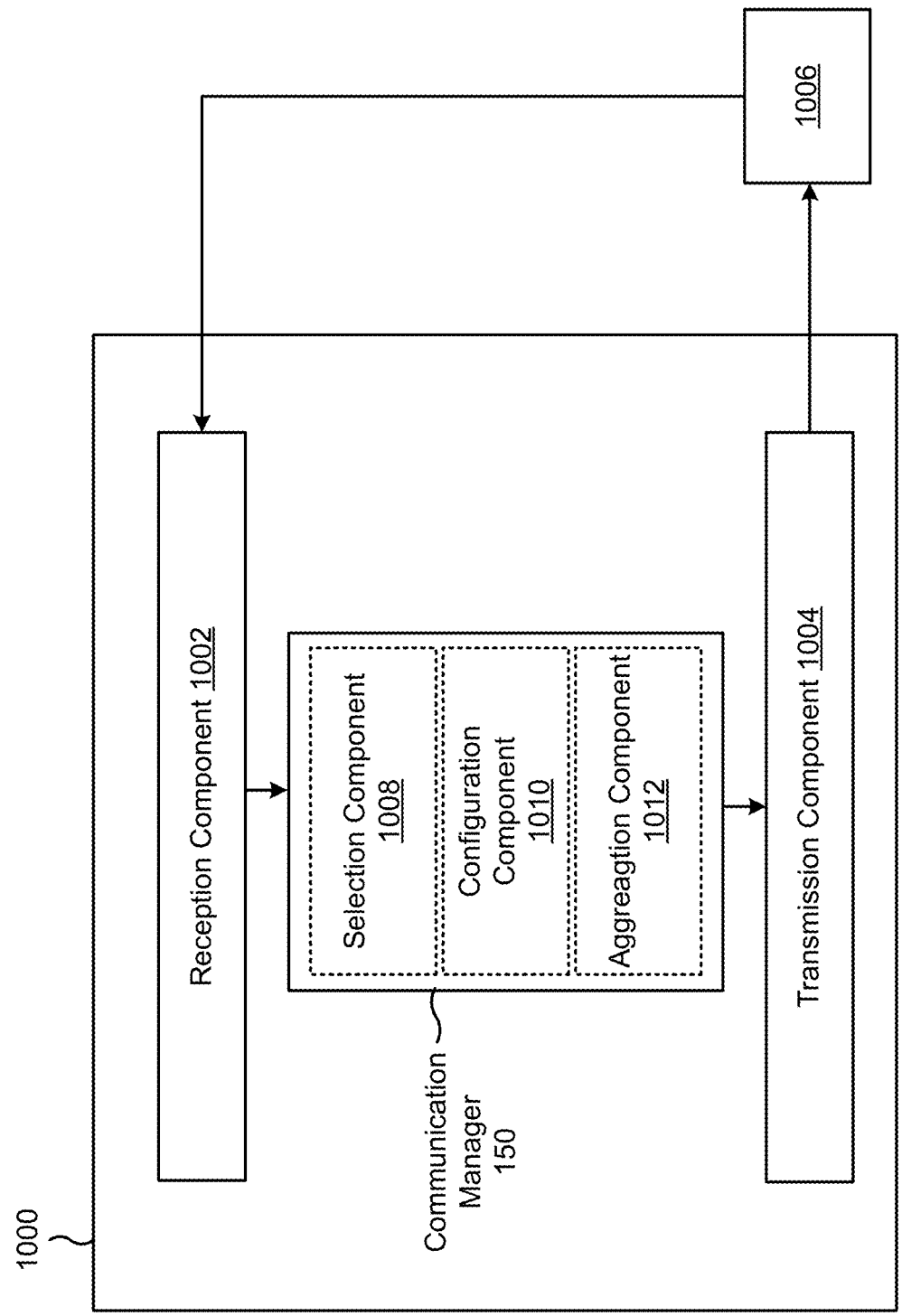
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node (e.g., network node 720), or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE 120, a network node 110, or another wireless communication device) using the reception component 1002 and the transmission component 1004. As further shown, the apparatus 1000 may include the communication manager 150. The communication manager 150 may include one or more of a selection component 1008, a configuration component 1010, or an aggregation component 1012, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node 110 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node 110 described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node 110 described in connection with FIG. 2. In some aspects, the transmission component 1004 may be co-located with the reception component 1002 in a transceiver.

The reception component 1002 may receive, from one or more UEs, feedback information associated with a distributed sensing procedure. The selection component 1008 may select, based at least in part on the feedback information, a set of UEs to be included in the distributed sensing procedure. The transmission component 1004 and/or the configuration component 1010 may transmit, to the set of UEs, an indication of configuration parameters associated with the distributed sensing procedure.

The selection component 1008 may select a low-resolution ADC setting associated with the distributed sensing procedure.

The transmission component 1004 and/or the configuration component 1010 may transmit, to the set of UEs, an indication of the low-resolution ADC setting.

The reception component 1002 may receive, from each UE, of the set of UEs, capability information associated with the distributed sensing procedure, wherein the configuration parameters associated with the distributed sensing procedure are based at least in part on the capability information.

The reception component 1002 may receive, from at least one UE, of the set of UEs, information associated with a sensing need of the at least one UE, wherein the configuration parameters associated with the distributed sensing procedure are based at least in part on the information associated with the sensing need of the at least one UE.

The reception component 1002 may receive, from each UE, of the set of UEs, an indication of at least one of a location associated with the UE, motion parameters associated with the UE, or an orientation associated with the UE.

The reception component 1002 may receive, from each UE, of the set of UEs, an indication of sensing information associated with the distributed sensing procedure.

The aggregation component 1012 may aggregate the sensing information from each UE, of the set of UEs, to create an aggregated sensing result.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
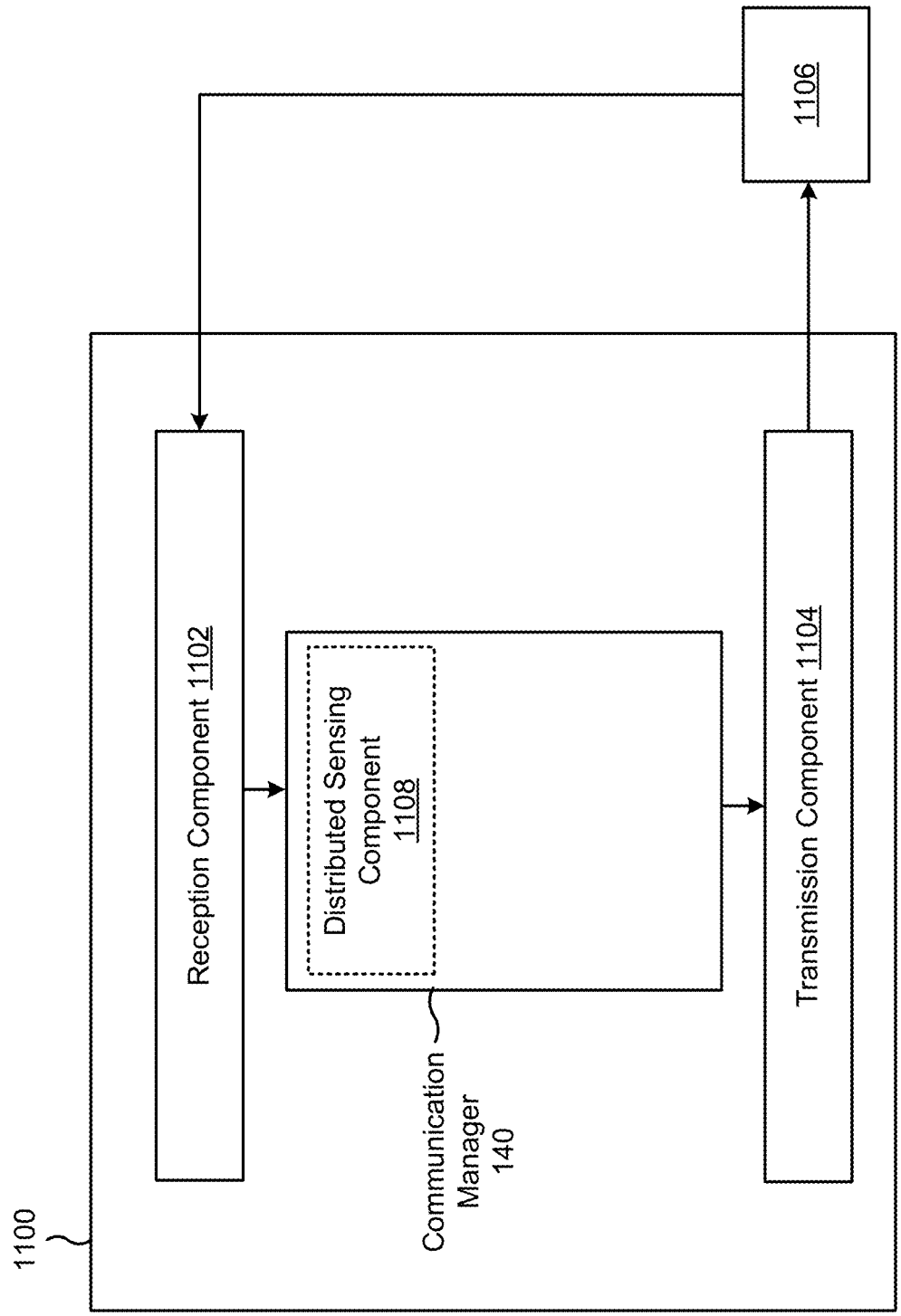
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE (e.g., a UE 120, the first UE 705, or a similar UE), or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE 120, a network node 110, or another wireless communication device) using the reception component 1102 and the transmission component 1104. As further shown, the apparatus 1100 may include the communication manager 140. The communication manager 140 may include a distributed sensing component 1108, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE 120 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE 120 described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE 120 described in connection with FIG. 2. In some aspects, the transmission component 1104 may be co-located with the reception component 1102 in a transceiver.

The transmission component 1104 may transmit, to a network node, feedback information associated with a distributed sensing procedure. The reception component 1102 may receive, from the network node, configuration parameters associated with the distributed sensing procedure, wherein the configuration parameters include at least one low-resolution ADC setting. The distributed sensing component 1108 may perform the distributed sensing procedure based at least in part on the configuration parameters.

The transmission component 1104 may transmit, to the network node, capability information associated with the distributed sensing procedure, wherein the configuration parameters associated with the distributed sensing procedure are based at least in part on the capability information.

The transmission component 1104 may transmit, to the network node, information associated with a sensing need of the UE, wherein the configuration parameters associated with the distributed sensing procedure are based at least in part on the information associated with the sensing need of the UE.

The transmission component 1104 may transmit, to the network node, an indication of at least one of a location associated with the UE, motion parameters associated with the UE, or an orientation associated with the UE.

The reception component 1102 may receive, from the network node, an indication of allocated resources for performing the distributed sensing procedure.

The transmission component 1104 may transmit, to the network node, an indication of sensing information associated with the distributed sensing procedure.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by an apparatus of a network node, comprising: receiving, from one or more UEs, feedback information associated with a distributed sensing procedure; selecting, based at least in part on the feedback information, a set of UEs to be included in the distributed sensing procedure; and transmitting, to the set of UEs, an indication of configuration parameters associated with the distributed sensing procedure.

Aspect 2: The method of Aspect 1, further comprising: selecting a low-resolution ADC setting associated with the distributed sensing procedure; and transmitting, to the set of UEs, an indication of the low-resolution ADC setting.

Aspect 3: The method of any of Aspects 1-2, wherein the feedback information includes an indication of at least one of: a sparsity ratio associated with a sensing channel, a dynamic range associated with the sensing channel, a coarse target distribution associated with the sensing channel, a radar cross-section associated with the sensing channel, one or more path loss model parameters associated with the sensing channel, or one or more interference measurements associated with the sensing channel.

Aspect 4: The method of any of Aspects 1-3, further comprising receiving, from each UE, of the set of UEs, capability information associated with the distributed sensing procedure, wherein the configuration parameters associated with the distributed sensing procedure are based at least in part on the capability information.

Aspect 5: The method of Aspect 4, wherein, for each UE, of the set of UEs, the capability information indicates at least one of: a number of antennas associated with the UE, a speed associated with an analog-to-digital converter (ADC) associated with the UE, a number of bits associated with the ADC, a power consumption associated with the ADC, or a field of view associated with the UE.

Aspect 6: The method of any of Aspects 1-5, further comprising receiving, from at least one UE, of the set of UEs, information associated with a sensing need of the at least one UE, wherein the configuration parameters associated with the distributed sensing procedure are based at least in part on the information associated with the sensing need of the at least one UE.

Aspect 7: The method of any of Aspects 1-6, further comprising receiving, from each UE, of the set of UEs, an indication of at least one of: a location associated with the UE, motion parameters associated with the UE, or an orientation associated with the UE.

Aspect 8: The method of any of Aspects 1-7, wherein at least one UE, of the set of UEs, is a roadside unit.

Aspect 9: The method of any of Aspects 1-8, wherein the configuration parameters include an indication of one or more of: an ADC resolution associated with the distributed sensing procedure, an ADC speed associated with the distributed sensing procedure, an automatic gain control setting associated with the distributed sensing procedure, or a transmission power setting associated with the distributed sensing procedure.

Aspect 10: The method of any of Aspects 1-9, wherein the configuration parameters include an indication of at least one of: joint waveform parameters associated with the distributed sensing procedure, joint beamforming parameters associated with the distributed sensing procedure, or a type of waveform associated with the distributed sensing procedure.

Aspect 11: The method of any of Aspects 1-10, further comprising allocating resources to each UE, of the set of UEs, for performing the distributed sensing procedure, wherein the configuration parameters include an indication of the resources.

Aspect 12: The method of any of Aspects 1-11, further comprising: receiving, from each UE, of the set of UEs, an indication of sensing information associated with the distributed sensing procedure; and aggregating the sensing information from each UE, of the set of UEs, to create an aggregated sensing result.

Aspect 13: A method of wireless communication performed by an apparatus of a UE, comprising: transmitting, to a network node, feedback information associated with a distributed sensing procedure; receiving, from the network node, configuration parameters associated with the distributed sensing procedure, wherein the configuration parameters include at least one low-resolution ADC setting; and performing the distributed sensing procedure based at least in part on the configuration parameters.

Aspect 14: The method of Aspect 13, wherein the feedback information includes an indication of at least one of: a sparsity ratio associated with a sensing channel, a dynamic range associated with the sensing channel, a coarse target distribution associated with the sensing channel, a radar cross-section associated with the sensing channel, one or more path loss model parameters associated with the sensing channel, or one or more interference measurements associated with the sensing channel.

Aspect 15: The method of any of Aspects 13-14, further comprising transmitting, to the network node, capability information associated with the distributed sensing procedure, wherein the configuration parameters associated with the distributed sensing procedure are based at least in part on the capability information.

Aspect 16: The method of Aspect 15, wherein the capability information indicates at least one of: a number of antennas associated with the UE, a speed associated with an ADC associated with the UE, a number of bits associated with the ADC, a power consumption associated with the ADC, or a field of view associated with the UE.

Aspect 17: The method of any of Aspects 13-16, further comprising transmitting, to the network node, information associated with a sensing need of the UE, wherein the configuration parameters associated with the distributed sensing procedure are based at least in part on the information associated with the sensing need of the UE.

Aspect 18: The method of any of Aspects 13-17, further comprising transmitting, to the network node, an indication of at least one of: a location associated with the UE, motion parameters associated with the UE, or an orientation associated with the UE.

Aspect 19: The method of any of Aspects 13-18, wherein the UE is a roadside unit.

Aspect 20: The method of any of Aspects 13-19, wherein the configuration parameters include an indication of one or more of: an ADC resolution associated with the distributed sensing procedure, an ADC speed associated with the distributed sensing procedure, an automatic gain control setting associated with the distributed sensing procedure, or a transmission power setting associated with the distributed sensing procedure.

Aspect 21: The method of any of Aspects 13-20, wherein the configuration parameters include an indication of at least one of: joint waveform parameters associated with the distributed sensing procedure, joint beamforming parameters associated with the distributed sensing procedure, or a type of waveform associated with the distributed sensing procedure.

Aspect 22: The method of any of Aspects 13-21, further comprising receiving, from the network node, an indication of allocated resources for performing the distributed sensing procedure.

Aspect 23: The method of any of Aspects 13-22, further comprising transmitting, to the network node, an indication of sensing information associated with the distributed sensing procedure.

Aspect 24: The method of Aspect 23, wherein the sensing information includes an indication of at least one of: a processed channel parameter associated with the distributed sensing procedure, an ADC resolution associated with the distributed sensing procedure, or an ADC speed associated with the distributed sensing procedure.

Aspect 25: An apparatus for wireless communication at a device, comprising a processor; memory coupled with the processor; and instructions stored in the memory and executable by the processor to cause the apparatus to perform the method of one or more of Aspects 1-12.

Aspect 26: A device for wireless communication, comprising a memory and one or more processors coupled to the memory, the one or more processors configured to perform the method of one or more of Aspects 1-12.

Aspect 27: An apparatus for wireless communication, comprising at least one means for performing the method of one or more of Aspects 1-12.

Aspect 28: A non-transitory computer-readable medium storing code for wireless communication, the code comprising instructions executable by a processor to perform the method of one or more of Aspects 1-12.

Aspect 29: A non-transitory computer-readable medium storing a set of instructions for wireless communication, the set of instructions comprising one or more instructions that, when executed by one or more processors of a device, cause the device to perform the method of one or more of Aspects 1-12.

Aspect 30: An apparatus for wireless communication at a device, comprising a processor; memory coupled with the processor; and instructions stored in the memory and executable by the processor to cause the apparatus to perform the method of one or more of Aspects 13-24.

Aspect 31: A device for wireless communication, comprising a memory and one or more processors coupled to the memory, the one or more processors configured to perform the method of one or more of Aspects 13-24.

Aspect 32: An apparatus for wireless communication, comprising at least one means for performing the method of one or more of Aspects 13-24.

Aspect 33: A non-transitory computer-readable medium storing code for wireless communication, the code comprising instructions executable by a processor to perform the method of one or more of Aspects 13-24.

Aspect 34: A non-transitory computer-readable medium storing a set of instructions for wireless communication, the set of instructions comprising one or more instructions that, when executed by one or more processors of a device, cause the device to perform the method of one or more of Aspects 13-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
   one or more memories; and
   one or more processors, based at least in part on information stored in the one or more memories, configured to:
   receive, from one or more user equipments (UEs), feedback information associated with a distributed sensing procedure;
   select, based at least in part on the feedback information, a set of UEs to be included in the distributed sensing procedure; and
   transmit, to the set of UEs, an indication of configuration parameters associated with the distributed sensing procedure, wherein the configuration parameters include an indication of a low-resolution analog-to-digital converter (ADC) setting associated with the distributed sensing procedure.

2. The network node of claim 1, wherein the one or more processors are further configured to:
   select the low-resolution ADC setting associated with the distributed sensing procedure.

3. The network node of claim 1, wherein the feedback information includes an indication of at least one of:
   a sparsity ratio associated with a sensing channel,
   a dynamic range associated with the sensing channel,
   a coarse target distribution associated with the sensing channel,
   a radar cross-section associated with the sensing channel,
   one or more path loss model parameters associated with the sensing channel, or
   one or more interference measurements associated with the sensing channel.

4. The network node of claim 1, wherein the one or more processors are further configured to receive, from each UE, of the set of UEs, capability information associated with the distributed sensing procedure, wherein the configuration parameters associated with the distributed sensing procedure are based at least in part on the capability information.

5. The network node of claim 4, wherein, for each UE, of the set of UEs, the capability information indicates at least one of:
   a number of antennas associated with the UE,
   a speed associated with an ADC associated with the UE,
   a number of bits associated with the ADC,
   a power consumption associated with the ADC, or
   a field of view associated with the UE.

6. The network node of claim 1, wherein the one or more processors are further configured to receive, from at least one UE, of the set of UEs, information associated with a sensing need of the at least one UE, wherein the configuration parameters associated with the distributed sensing procedure are based at least in part on the information associated with the sensing need of the at least one UE.

7. The network node of claim 1, wherein the one or more processors are further configured to receive, from each UE, of the set of UEs, an indication of at least one of:
   a location associated with the UE,
   motion parameters associated with the UE, or
   an orientation associated with the UE.

8. The network node of claim 1, wherein at least one UE, of the set of UEs, is a roadside unit.

9. The network node of claim 1, wherein the configuration parameters include an indication of one or more of:
   an ADC resolution associated with the distributed sensing procedure,
   an ADC speed associated with the distributed sensing procedure,
   an automatic gain control setting associated with the distributed sensing procedure, or
   a transmission power setting associated with the distributed sensing procedure.

10. The network node of claim 1, wherein the configuration parameters include an indication of at least one of:
    joint waveform parameters associated with the distributed sensing procedure,
    joint beamforming parameters associated with the distributed sensing procedure, or
    a type of waveform associated with the distributed sensing procedure.

11. The network node of claim 1, wherein the one or more processors are further configured to allocating resources to each UE, of the set of UEs, for performing the distributed sensing procedure, wherein the configuration parameters include an indication of the resources.

12. The network node of claim 1, wherein the one or more processors are further configured to:
    receive, from each UE, of the set of UEs, an indication of sensing information associated with the distributed sensing procedure; and
    aggregate the sensing information from each UE, of the set of UEs, to create an aggregated sensing result.

13. An apparatus for wireless communication at a user equipment (UE), comprising:
    one or more memories; and one or more processors, based at least in part on information stored in the one or more memories, configured to:
- transmit, to a network node, feedback information associated with a distributed sensing procedure;
- receive, from the network node, configuration parameters associated with the distributed sensing procedure, wherein the configuration parameters include at least one low-resolution analog-to-digital converter (ADC) setting; and
- perform the distributed sensing procedure based at least in part on the configuration parameters.

14. The UE of claim 13, wherein the feedback information includes an indication of at least one of:
- a sparsity ratio associated with a sensing channel,
- a dynamic range associated with the sensing channel,
- a coarse target distribution associated with the sensing channel,
- a radar cross-section associated with the sensing channel,
- one or more path loss model parameters associated with the sensing channel, or
- one or more interference measurements associated with the sensing channel.

15. The UE of claim 13, wherein the one or more processors are further configured to transmit, to the network node, capability information associated with the distributed sensing procedure, wherein the configuration parameters associated with the distributed sensing procedure are based at least in part on the capability information.

16. The UE of claim 15, wherein the capability information indicates at least one of:
- a number of antennas associated with the UE,
- a speed associated with an ADC associated with the UE,
- a number of bits associated with the ADC,
- a power consumption associated with the ADC, or
- a field of view associated with the UE.

17. The UE of claim 13, wherein the one or more processors are further configured to transmit, to the network node, information associated with a sensing need of the UE, wherein the configuration parameters associated with the distributed sensing procedure are based at least in part on the information associated with the sensing need of the UE.

18. The UE of claim 13, wherein the one or more processors are further configured to transmit, to the network node, an indication of at least one of:
- a location associated with the UE,
- motion parameters associated with the UE, or
- an orientation associated with the UE.

19. The UE of claim 13, wherein the UE is a roadside unit.

20. The UE of claim 13, wherein the configuration parameters include an indication of one or more of:
- an ADC resolution associated with the distributed sensing procedure,
- an ADC speed associated with the distributed sensing procedure,
- an automatic gain control setting associated with the distributed sensing procedure, or
- a transmission power setting associated with the distributed sensing procedure.

21. The UE of claim 13, wherein the configuration parameters include an indication of at least one of:
- joint waveform parameters associated with the distributed sensing procedure,
- joint beamforming parameters associated with the distributed sensing procedure, or
- a type of waveform associated with the distributed sensing procedure.

22. The UE of claim 13, wherein the one or more processors are further configured to receive, from the network node, an indication of allocated resources for performing the distributed sensing procedure.

23. The UE of claim 13, wherein the one or more processors are further configured to transmit, to the network node, an indication of sensing information associated with the distributed sensing procedure.

24. The UE of claim 23, wherein the sensing information includes an indication of at least one of:
- a processed channel parameter associated with the distributed sensing procedure,
- an ADC resolution associated with the distributed sensing procedure, or
- an ADC speed associated with the distributed sensing procedure.

25. A method of wireless communication performed by an apparatus of a network node, comprising:
- receiving, from one or more user equipments (UEs), feedback information associated with a distributed sensing procedure;
- selecting, based at least in part on the feedback information, a set of UEs to be included in the distributed sensing procedure; and
- transmitting, to the set of UEs, an indication of configuration parameters associated with the distributed sensing procedure, wherein the configuration parameters include a low-resolution analog-to-digital converter (ADC) setting associated with the distributed sensing procedure.

26. The method of claim 25, further comprising:
- selecting the ADC setting associated with the distributed sensing procedure.

27. The method of claim 25, wherein the feedback information includes an indication of at least one of:
- a sparsity ratio associated with a sensing channel,
- a dynamic range associated with the sensing channel,
- a coarse target distribution associated with the sensing channel,
- a radar cross-section associated with the sensing channel,
- one or more path loss model parameters associated with the sensing channel, or
- one or more interference measurements associated with the sensing channel.

28. A method of wireless communication performed by an apparatus of a user equipment (UE), comprising:
- transmitting, to a network node, feedback information associated with a distributed sensing procedure;
- receiving, from the network node, configuration parameters associated with the distributed sensing procedure, wherein the configuration parameters include at least one low-resolution analog-to-digital converter (ADC) setting; and
- performing the distributed sensing procedure based at least in part on the configuration parameters.

29. The method of claim 28, further comprising transmitting, to the network node, capability information associated with the distributed sensing procedure, wherein the configuration parameters associated with the distributed sensing procedure are based at least in part on the capability information.

30. The method of claim 28, further comprising transmitting, to the network node, information associated with a sensing need of the UE, wherein the configuration parameters associated with the distributed sensing procedure are based at least in part on the information associated with the sensing need of the UE.

\* \* \* \* \*